(12) United States Patent
Han et al.

(10) Patent No.: US 10,175,828 B2
(45) Date of Patent: Jan. 8, 2019

(54) METHOD FOR AUTHENTICATING CAPACITIVE TOUCH

(71) Applicant: 12CM, Seongnam-si (KR)

(72) Inventors: Jeong-Gyoun Han, Seongnam-si (KR); Jae-Hyung Kim, Seoul (KR)

(73) Assignee: 12CM GLOBAL PTE. LTD., Singapore (SG)

( * ) Notice: Subject to any disclaimer, the term of this patent is extended or adjusted under 35 U.S.C. 154(b) by 329 days.

(21) Appl. No.: 14/653,851

(22) PCT Filed: Oct. 8, 2014

(86) PCT No.: PCT/KR2014/009490
§ 371 (c)(1),
(2) Date: Jun. 19, 2015

(87) PCT Pub. No.: WO2015/053563
PCT Pub. Date: Apr. 16, 2015

(65) Prior Publication Data
US 2015/0355750 A1    Dec. 10, 2015

(30) Foreign Application Priority Data
Oct. 8, 2013    (KR) .................. 10-2013-0120202

(51) Int. Cl.
*G06F 3/044* (2006.01)
*G06F 21/36* (2013.01)

(52) U.S. Cl.
CPC .............. *G06F 3/044* (2013.01); *G06F 21/36* (2013.01); *G06F 2203/04104* (2013.01)

(58) Field of Classification Search
CPC .......... G06F 21/32; G06F 3/017; G06F 21/30; G06F 21/31; G06F 3/044; G06F 3/04886
See application file for complete search history.

(56) References Cited

U.S. PATENT DOCUMENTS

| 5,327,161 A * | 7/1994 | Logan ................ G06F 3/038 345/157 |
| 6,367,015 B1 * | 4/2002 | Kubo .................. G06F 3/0488 345/173 |

(Continued)

FOREIGN PATENT DOCUMENTS

| JP | 2011-134298 | 7/2011 |
| JP | 2012-99093 | 5/2012 |

(Continued)

OTHER PUBLICATIONS

Extended European Search Report dated Apr. 29, 2016 for European Patent Application No. 14852275.8.

(Continued)

*Primary Examiner* — Michael J Jansen, II
(74) *Attorney, Agent, or Firm* — Ladas & Parry, LLP

(57) ABSTRACT

A method for authenticating capacitive touch, executed through a system interworking with a capacitive touch screen supporting multi-touch, comprises receiving touch point information for touch points recognized as multi-touch through the capacitive touch screen, reading the touch point information and identifying a specified touch point corresponding to any one specified touch portion fixed and arranged in a previously specified position in design among touch portions of a touch device in which capacitively touchable touch portions are arranged according to a previously designed unique geometric relationship, coordinate-rotating the touch points or a geometric relationship for the touch points to match a designed geometric relationship based on a reference point corresponding to the specified touch point, and authenticating whether the coordinate-rotated geometric relationship matches the designed geometric relationship within a tolerance range or identifying the designed geometric relationship matching the coordi- (Continued)

nate-rotated geometric relationship within a tolerance range among the designed geometric relationships.

28 Claims, 17 Drawing Sheets

(56) References Cited

U.S. PATENT DOCUMENTS

| | | | | |
|---|---|---|---|---|
| 6,879,710 | B1* | 4/2005 | Hinoue | G06F 21/32 340/5.53 |
| 7,007,168 | B2* | 2/2006 | Kubo | G06F 3/0488 345/173 |
| 7,590,858 | B2* | 9/2009 | Kubo | G06F 3/0488 345/173 |
| 7,877,707 | B2* | 1/2011 | Westerman | G06F 3/04883 715/863 |
| 8,237,068 | B2* | 8/2012 | Szaikowski | G06F 3/044 178/18.06 |
| 8,310,453 | B1* | 11/2012 | Krack | G06F 21/36 178/18.01 |
| 8,330,740 | B2* | 12/2012 | Kang | G06F 3/0416 345/174 |
| 8,339,374 | B2* | 12/2012 | Chang | G06F 3/0488 345/173 |
| 8,571,521 | B2* | 10/2013 | Kim | H04M 1/72577 455/411 |
| 8,659,560 | B2* | 2/2014 | Nagata | G06F 3/044 178/18.01 |
| 8,669,965 | B2* | 3/2014 | Yamamoto | G06F 1/1656 345/174 |
| 8,698,767 | B2* | 4/2014 | Kwak | G06F 3/044 178/18.05 |
| 8,760,422 | B2* | 6/2014 | Ikeda | G06F 3/041 178/18.03 |
| 8,766,337 | B2* | 7/2014 | Aichi | G02F 1/1368 257/26 |
| 8,810,547 | B2* | 8/2014 | Yamamoto | G06F 1/1656 345/174 |
| 8,872,788 | B2* | 10/2014 | Stolov | G06F 3/044 345/173 |
| 9,001,079 | B2* | 4/2015 | Kang | G06F 3/0416 345/174 |
| 9,064,104 | B2* | 6/2015 | Riddiford | G06F 21/36 |
| 9,122,338 | B2* | 9/2015 | Chien | G06F 3/0421 |
| 9,152,279 | B2* | 10/2015 | Moberg | G06F 3/044 |
| 9,215,796 | B2* | 12/2015 | Chuang | H05K 1/0274 |
| 9,274,641 | B2* | 3/2016 | Heatherly | A63F 13/02 |
| 9,275,210 | B2* | 3/2016 | Adams | G06F 21/316 |
| 9,857,922 | B2* | 1/2018 | Liu | G06F 3/044 |
| 10,048,783 | B2* | 8/2018 | Liu | G06F 3/041 |
| 2002/0108039 | A1* | 8/2002 | Kubo | G06F 3/0488 713/172 |
| 2006/0143467 | A1* | 6/2006 | Kubo | G06F 3/0488 713/183 |
| 2008/0168403 | A1* | 7/2008 | Westerman | G06F 3/04883 715/863 |
| 2010/0009658 | A1* | 1/2010 | Wu | H04M 1/673 455/411 |
| 2010/0182250 | A1* | 7/2010 | Kang | G06F 3/0416 345/173 |
| 2010/0302206 | A1* | 12/2010 | Yu | G06F 3/041 345/174 |
| 2010/0322485 | A1* | 12/2010 | Riddiford | G06F 21/36 382/115 |
| 2011/0032193 | A1* | 2/2011 | Szalkowski | G06F 3/044 345/173 |
| 2011/0074730 | A1* | 3/2011 | Nagata | G06F 3/044 345/174 |
| 2011/0102333 | A1* | 5/2011 | Westerman | G06F 3/04883 345/173 |
| 2011/0108625 | A1* | 5/2011 | Lee | G06K 19/06 235/448 |
| 2011/0175816 | A1* | 7/2011 | Shin | G06F 3/04883 345/168 |
| 2011/0216038 | A1* | 9/2011 | Stolov | G06F 3/044 345/174 |
| 2011/0227871 | A1* | 9/2011 | Cannon | A63F 13/02 |
| 2011/0283354 | A1* | 11/2011 | Chang | G06F 3/0488 726/19 |
| 2012/0017273 | A1* | 1/2012 | Son | G06F 21/35 726/20 |
| 2012/0044165 | A1* | 2/2012 | Kwak | G06F 3/044 345/173 |
| 2012/0046077 | A1* | 2/2012 | Kim | H04M 1/72577 455/566 |
| 2012/0062490 | A1* | 3/2012 | Heatherly | H04M 1/72577 455/566 |
| 2012/0068962 | A1* | 3/2012 | Yamamoto | G06F 1/1656 345/174 |
| 2012/0113021 | A1* | 5/2012 | Liu | G06F 3/041 345/173 |
| 2012/0113061 | A1* | 5/2012 | Ikeda | G06F 3/041 345/175 |
| 2012/0241825 | A1* | 9/2012 | Aichi | G02F 1/1368 257/290 |
| 2013/0194202 | A1* | 8/2013 | Moberg | G06F 3/044 345/173 |
| 2014/0047561 | A1* | 2/2014 | Mori | G06F 21/31 726/28 |
| 2014/0092062 | A1 | 4/2014 | Yamamoto | G06F 1/1656 345/174 |
| 2014/0182888 | A1* | 7/2014 | Chuang | H05K 1/0274 174/251 |
| 2014/0182894 | A1* | 7/2014 | Liu | G06F 3/044 174/251 |
| 2014/0215550 | A1* | 7/2014 | Adams | G06F 21/316 726/1 |
| 2014/0304806 | A1* | 10/2014 | Koo | G06K 7/081 726/16 |
| 2014/0354594 | A1* | 12/2014 | Kreutzer | G06F 3/044 345/174 |
| 2014/0368451 | A1* | 12/2014 | Kang | G06F 3/0416 345/173 |
| 2015/0036062 | A1* | 2/2015 | Chien | G06F 3/0421 349/12 |
| 2015/0054750 | A9* | 2/2015 | Liu | G06F 3/041 345/173 |
| 2015/0293622 | A1* | 10/2015 | Han | H04W 12/06 345/174 |
| 2015/0355750 | A1* | 12/2015 | Han | G06F 21/36 345/174 |

FOREIGN PATENT DOCUMENTS

| | | |
|---|---|---|
| JP | 2012-118637 | 6/2012 |
| JP | 2012-168612 | 9/2012 |
| JP | 2012-256246 | 12/2012 |
| JP | 2013-12057 | 1/2013 |
| JP | 2013-120434 | 6/2013 |
| JP | 2015-31965 | 2/2015 |
| KR | 10-2013-001560 | 7/2013 |
| WO | 2012/070593 | 5/2012 |
| WO | 2013/105788 | 7/2013 |

OTHER PUBLICATIONS

Goodrich M et al.: "Approximate Geometric Pattern Matching under Rigid Motions", IEEE Transactions on Pattern Analysis and Machine Intelligence, IEEE Computer Society, USA, vol. 21, No. 4, Apr. 1, 1999, pp. 371-379.

Chang S-H et al.: "Fast Algorithm for Point Pattern Matching: Invariant to Translations, Rotations and Scale Changes", Pattern Recognition, Elsevier, GB. vol. 30, No. 2, Feb. 1, 1997, pp. 311-320.

Xiaoyun Wang et al.: "Point Pattern Matching Algorithm for Planar Point Sets under Euclidean Transform", Journal of Applied Mathematics, vol. 2012, Jan. 1, 2012, p. 12.

(56) References Cited

OTHER PUBLICATIONS

Office Action dated May 24, 2016 for Japanese Patent Application No. 2015-550346 and its English summary provided by Applicant's foreign counsel.
International Preliminary Report on Patentability (Chapter I) for PCT/KR2014/009490 issued on Apr. 12, 2016.
International Search Report and Written Opinion dated Jan. 2, 2015 for International Application No. PCT/KR2014/009490.
Office Action dated Aug. 9, 2017 for Chinese Patent Application No. 201480003824.2 and its English translation by Global Dossier.
Notice of Allowance dated Nov. 17, 2017 for Chinese Patent Application No. 201480003824.2 and its English translation by Global Dossier.
Decision to Grant dated Jul. 26, 2018 for European Patent Application No. 14 852 275.8.

\* cited by examiner

[FIG. 1]
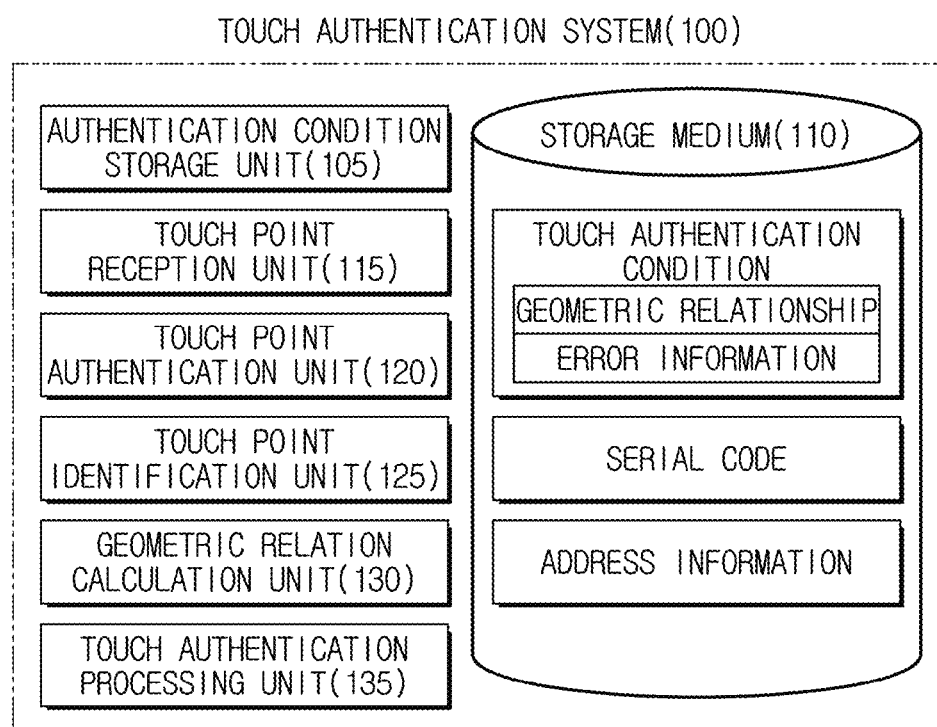

[FIG. 2A]
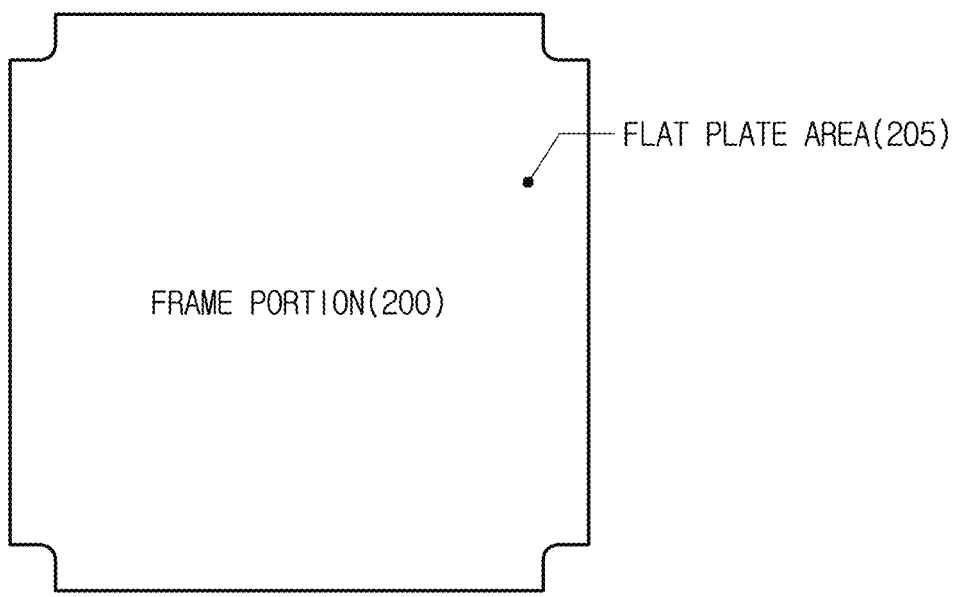

[FIG. 2B]
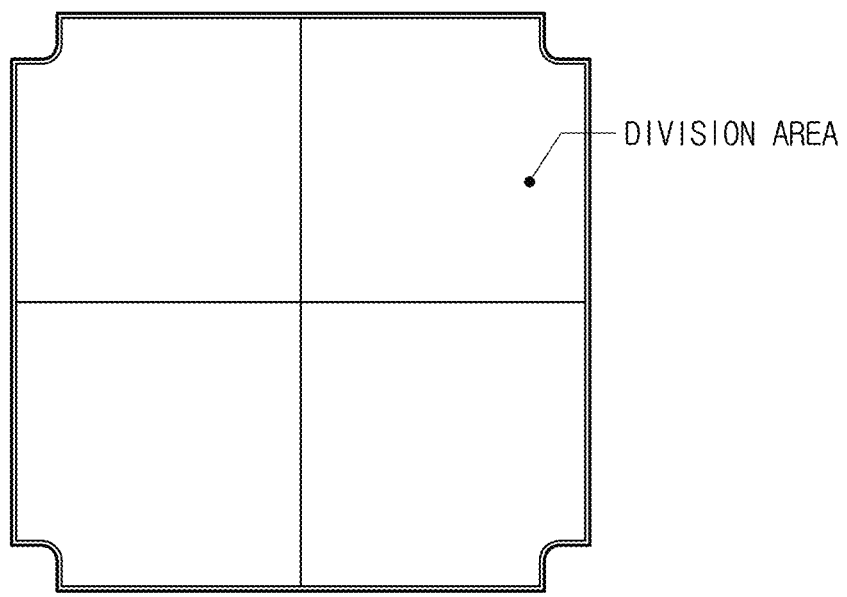

[FIG. 2C]
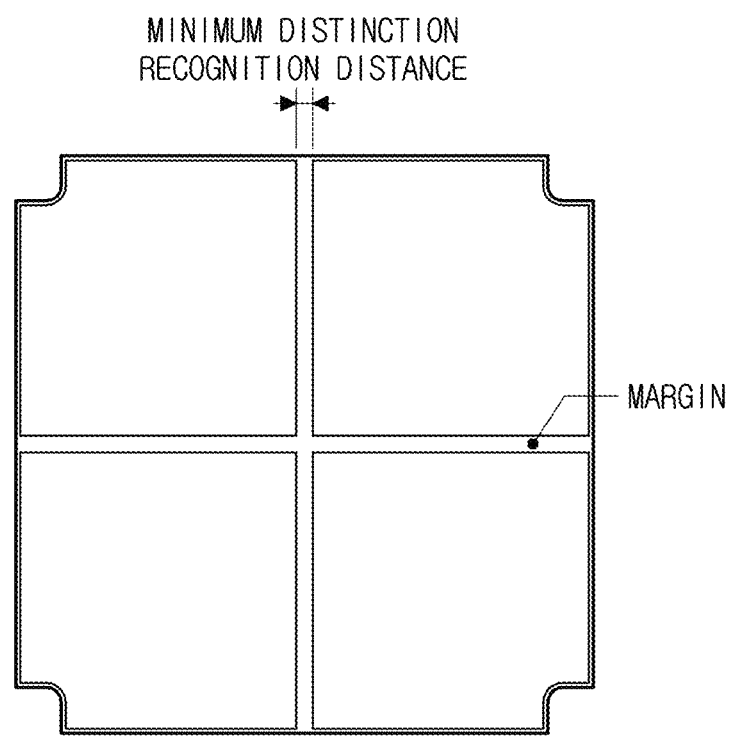

[FIG. 3A]
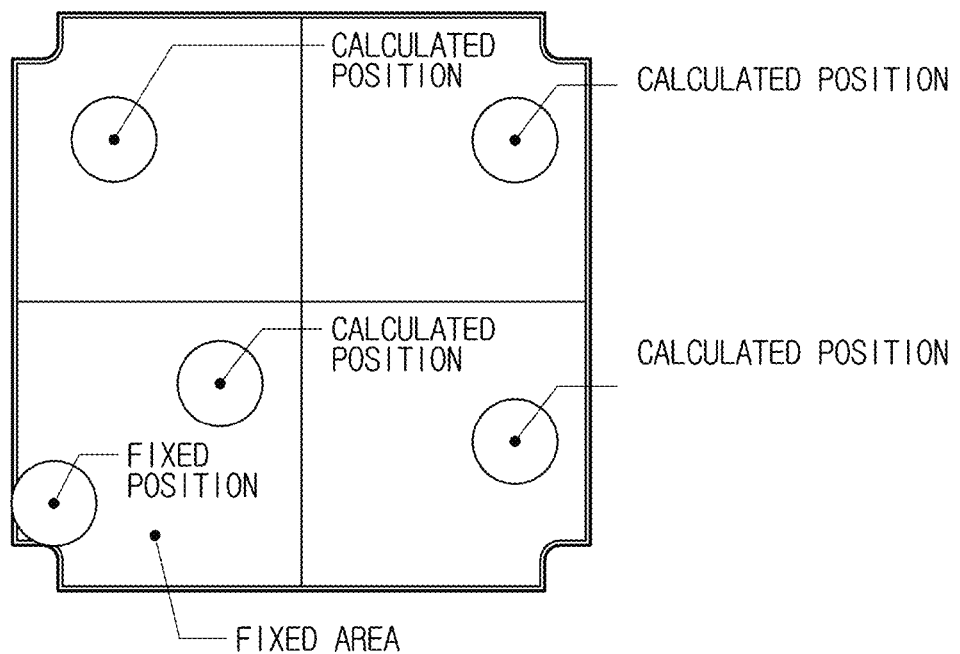

[FIG. 3B]
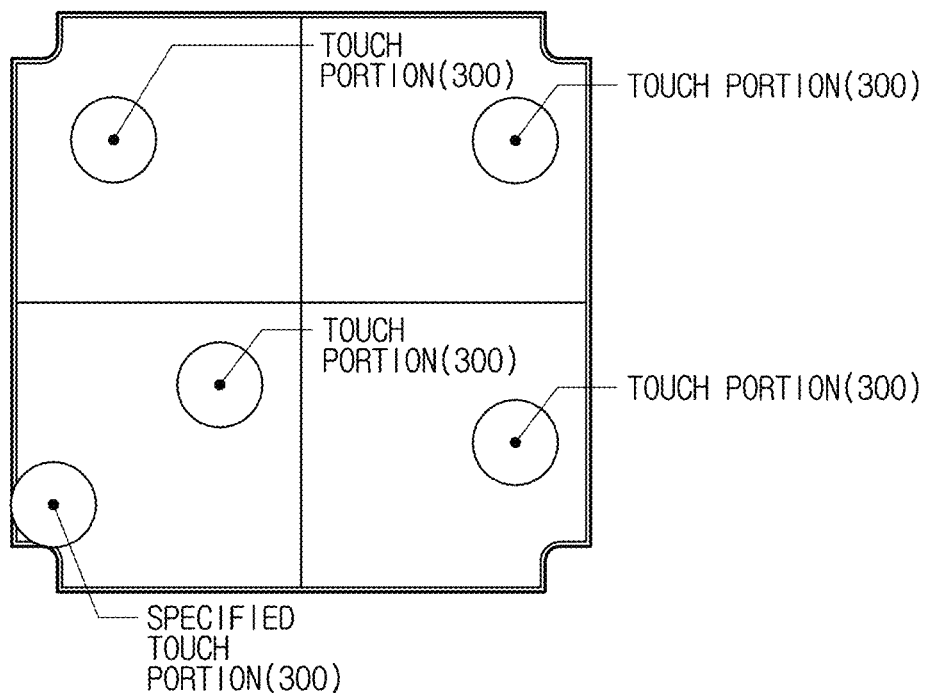

[FIG. 4A]
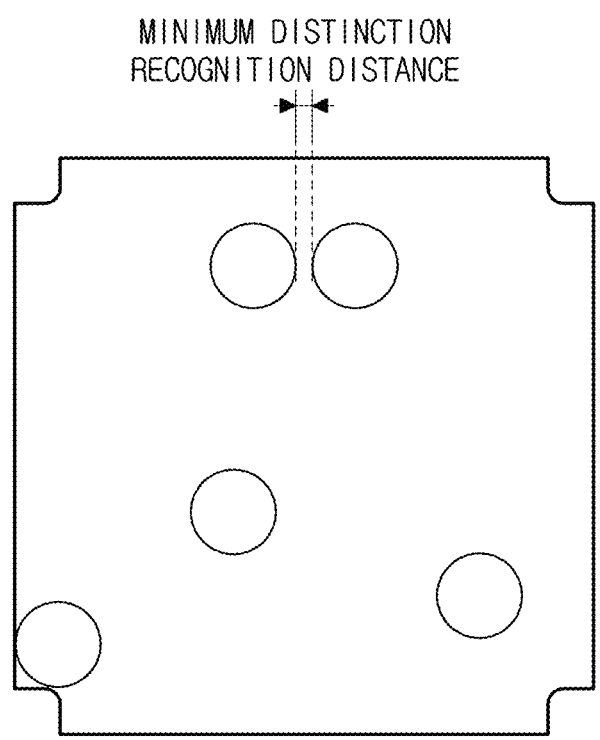

[FIG. 4B]
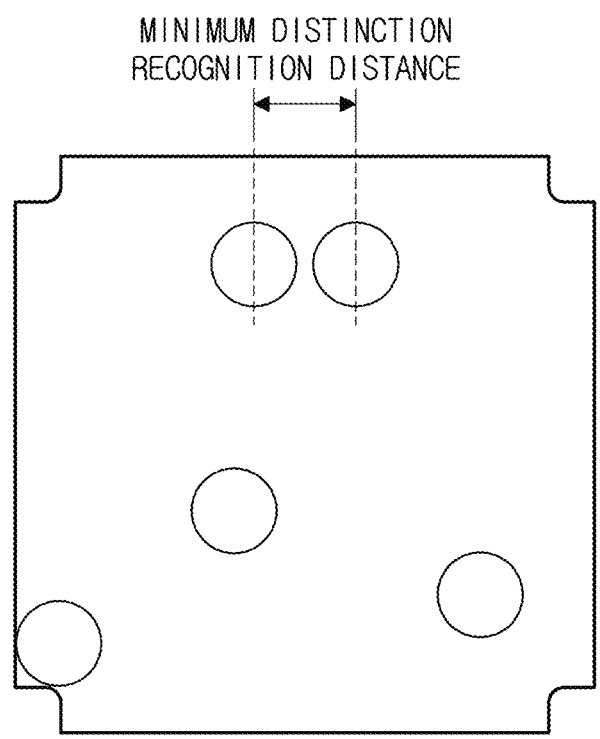

【FIG. 5】
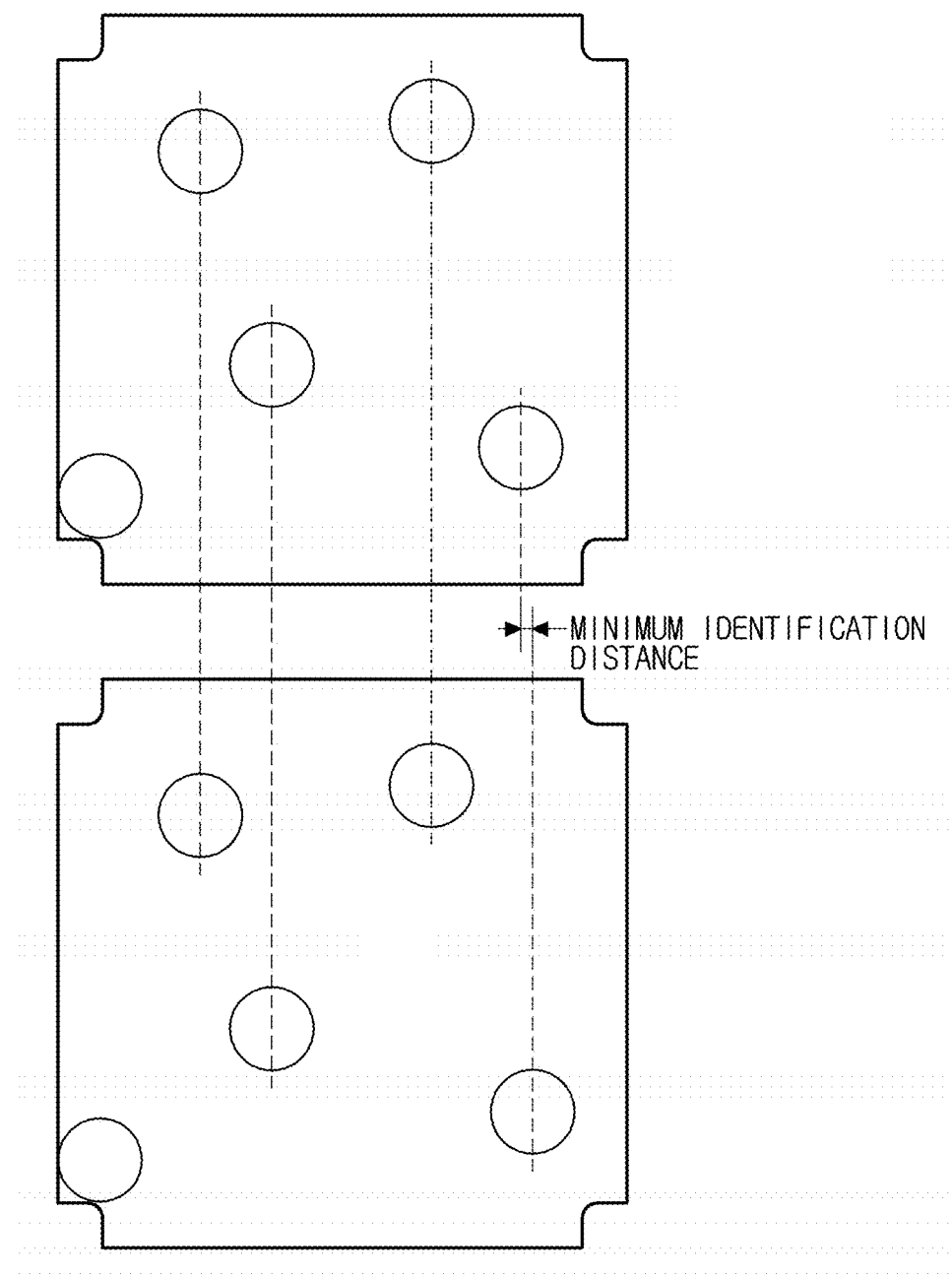

[FIG. 6]
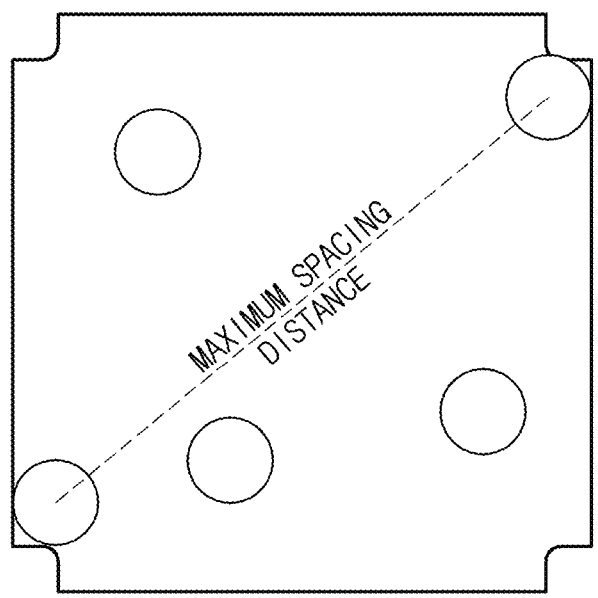

[FIG. 7]
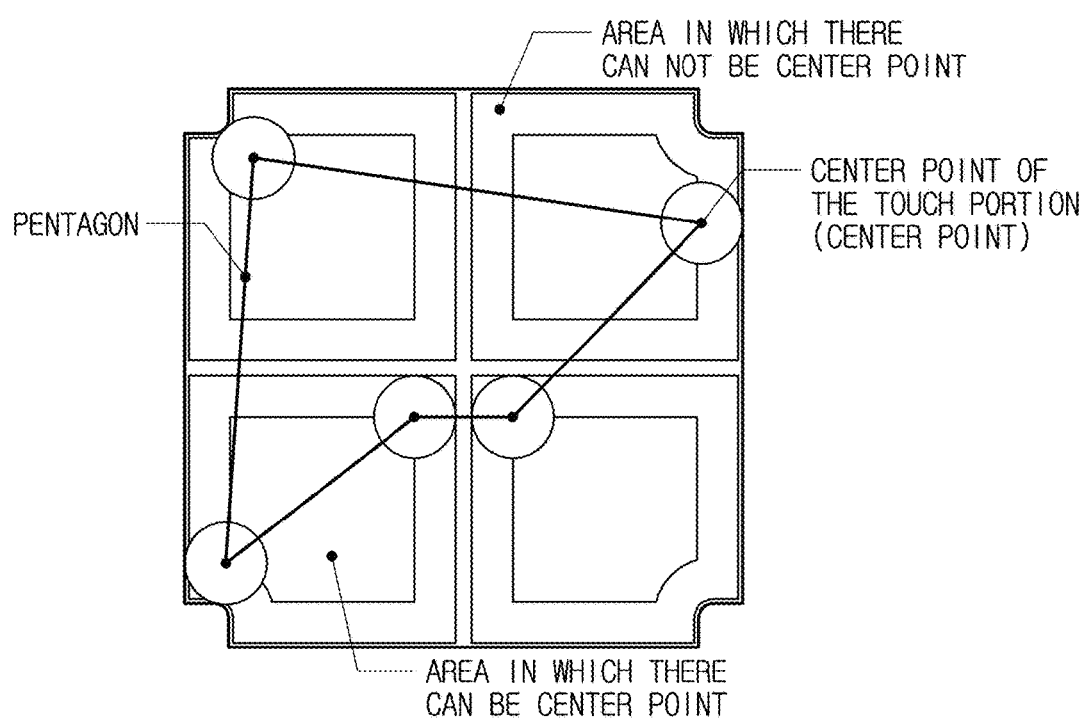

[FIG. 8]
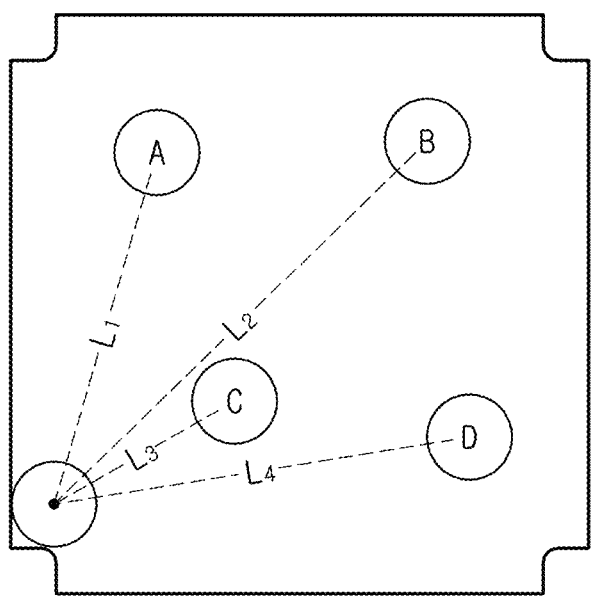

[FIG. 9A]
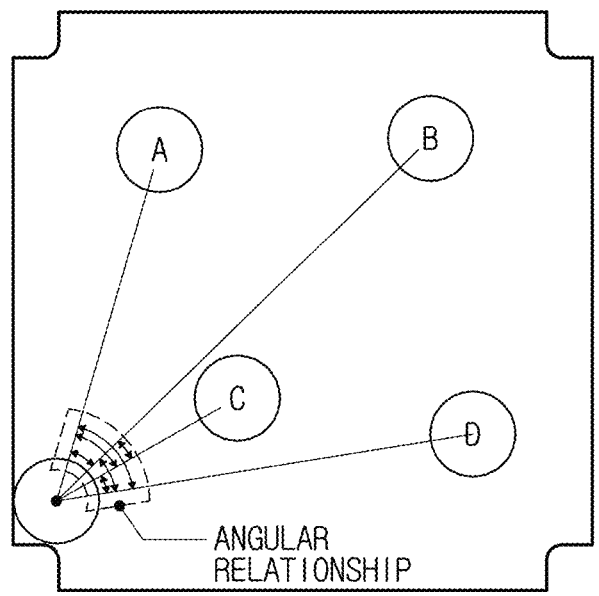

[FIG. 9B]
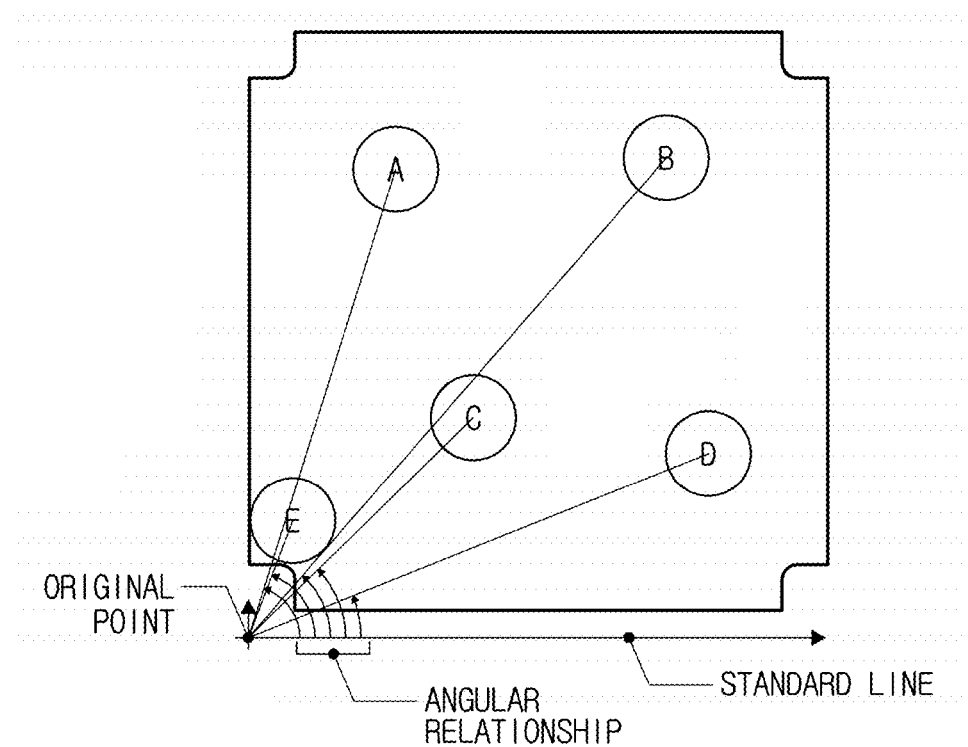

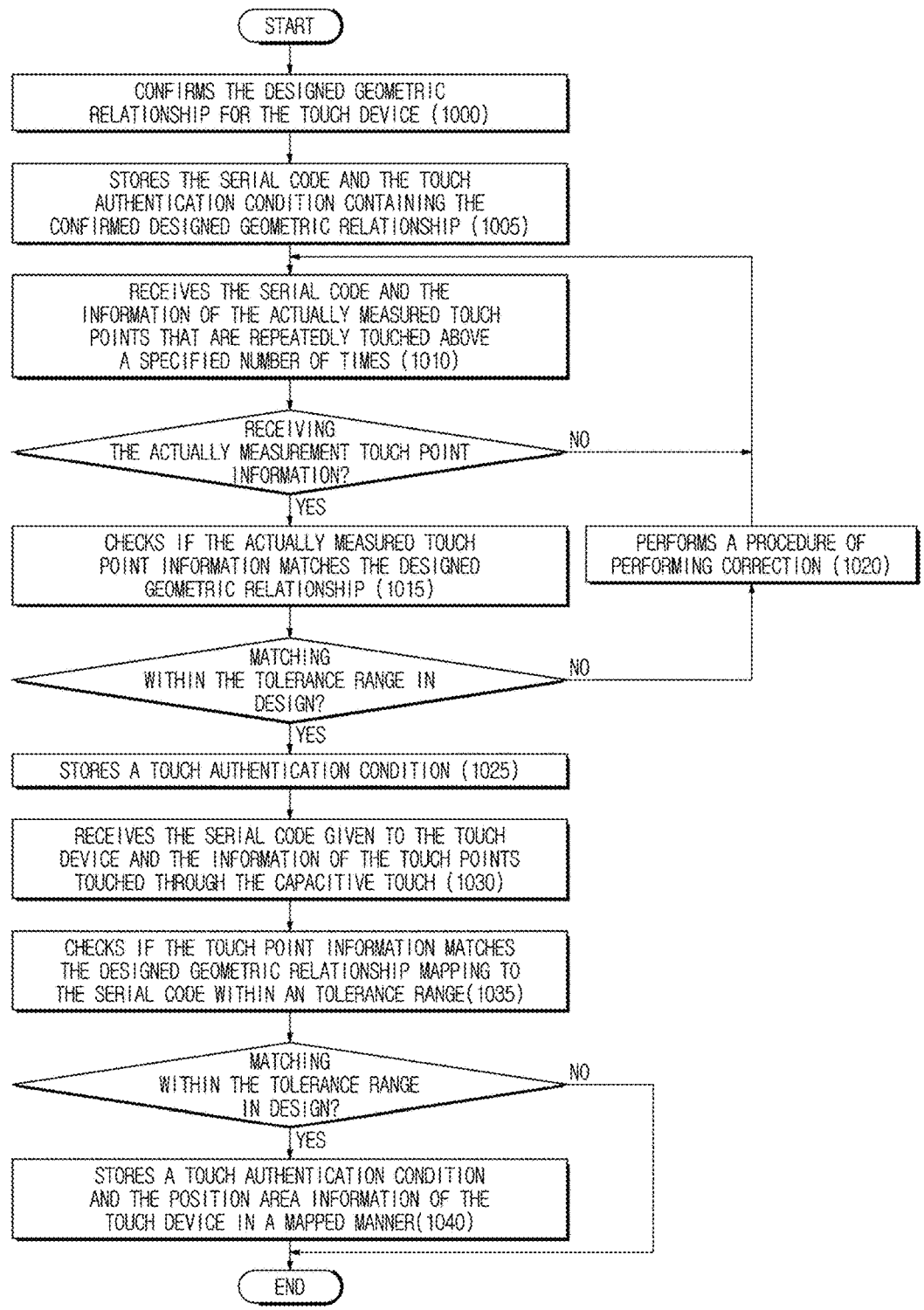
[FIG. 10]

[FIG. 11]
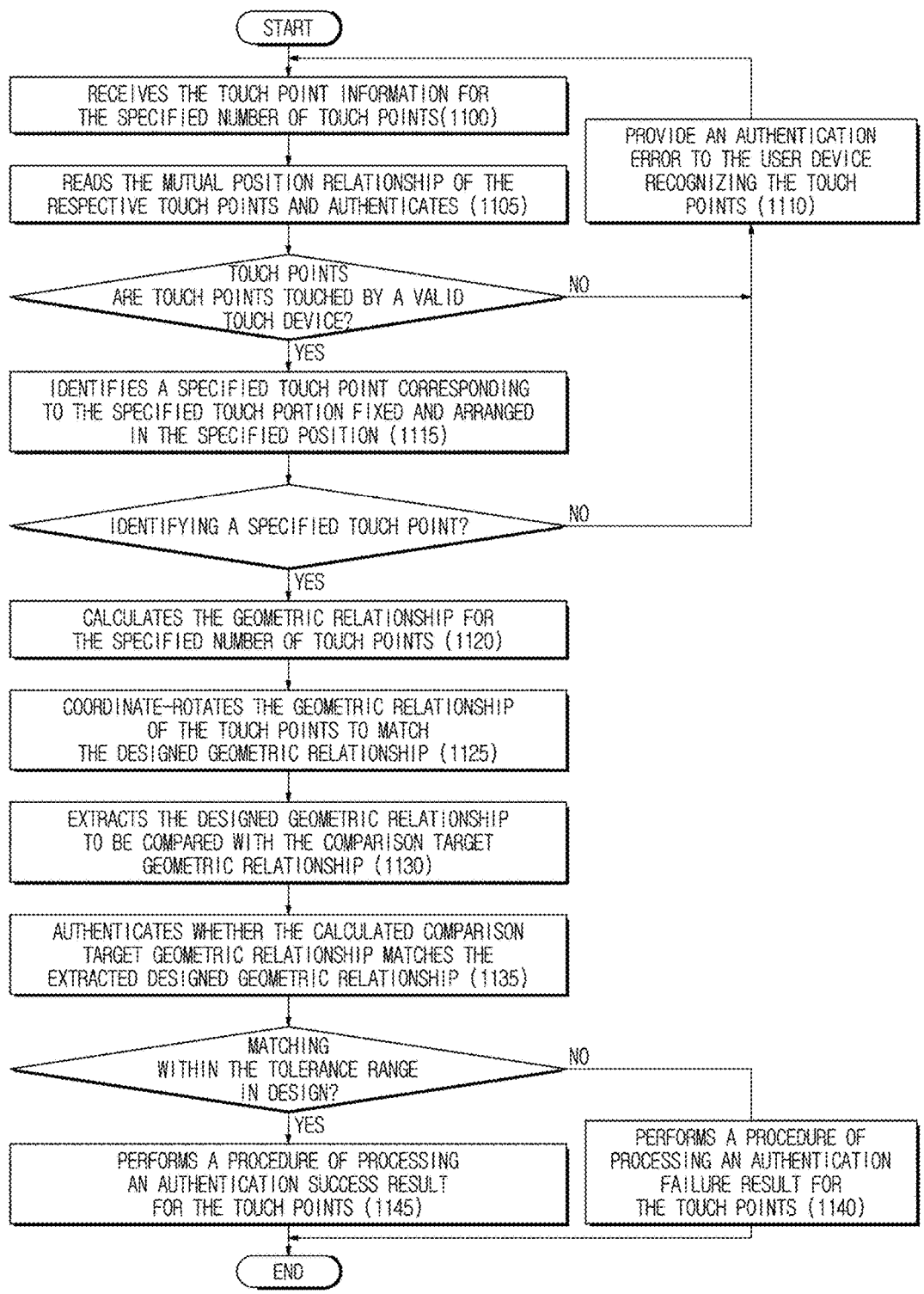

[FIG. 12]
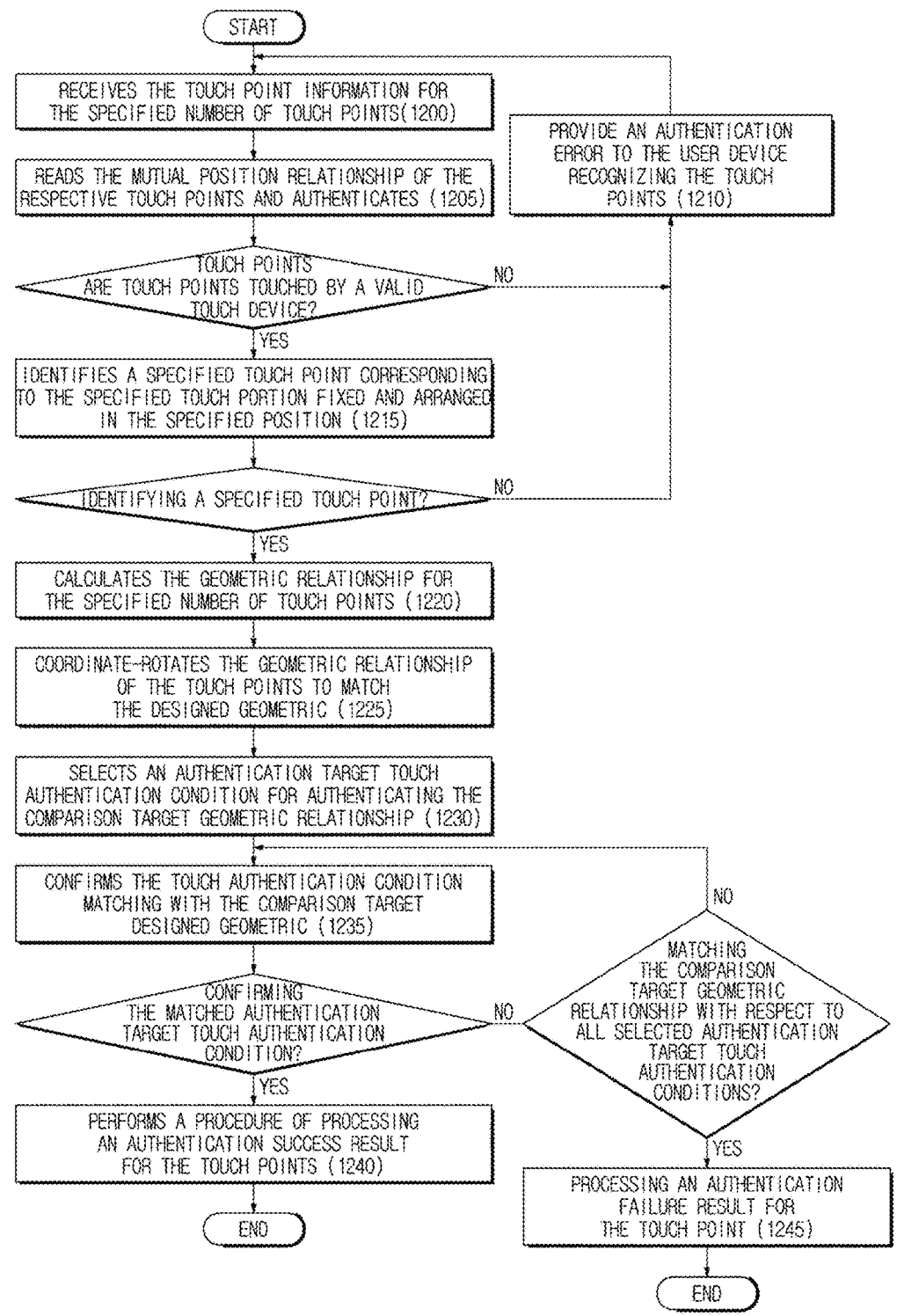

METHOD FOR AUTHENTICATING CAPACITIVE TOUCH

CROSS-REFERENCE TO RELATED APPLICATION(S)

This application is the U.S. National Stage of International Patent Application No. PCT/KR2014/009490 filed on Oct. 8, 2014, which claims priority to Korean Patent Application No. 10-2013-0120202 filed on Oct. 8, 2013, the disclosures of which are hereby incorporated in their entireties by reference.

TECHNICAL FIELD

The present invention relates to comparison and authentication to determine whether a geometric relationship formed by a specified number of touch points touched in a capacitive touch screen matches a previously registered designed geometric relationship even when a touch device in which a specified number of touch portions formed of a capacitively touchable material are arranged according to a previously designed unique geometric relationship is freely touched without being aligned in a specific position or a specific direction in the capacitive touch screen when the touch device is touched in a capacitive touch screen.

BACKGROUND ART

A service in which a touch device in which a plurality of capacitively touchable touch portions are arranged according to a previously designed geometric relationship is touched in a capacitive touch screen included in a user device, and a geometric relationship formed by the plurality of touch portions is used as various authentication means or identification means is disclosed.

A normal capacitive touch screen is designed so that a touch with fingers of a user is used as an input means, and is optimized to do so. In the case of recent smartphones, the capacitive touch screen supports multi-touch and is designed so that multi-touch using fingers (for example, pinch-to-zoom) is used as a input means.

Meanwhile, in order to use a geometric relationship of a plurality of touch portions included in the touch device as an authentication means or an identification means, a geometric position relationship of a plurality of touch portions included in different touch devices should have different uniqueness, and recognition and authentication can be conveniently realized even when the touch portions of such a touch device are arranged in any position or any direction of the capacitive touch screen. However, there is a problem in that it is difficult to provide uniqueness and the convenience of the touch device to be used as an authentication means or an identification means only with a multi-touch scheme optimized as an input means.

DISCLOSURE

Technical Problem

In order to solve the problem as described above, an object of the present invention is to provide a method for authenticating capacitive touch, the method including receiving touch point information for a plurality of touch points recognized as multi-touch through a capacitive touch screen of a user device, reading the touch point information, identifying a specified touch point corresponding to any one specified touch portion fixed and arranged in a previously specified position in design among touch portions of a touch device in which a plurality of capacitively touchable touch portions are arranged according to a previously designed unique geometric relationship, coordinate-rotating a geometric relationship for the plurality of touch points to match a designed geometric relationship based on a reference point corresponding to the specified touch point, and authenticating whether the coordinate-rotated geometric relationship matches the designed geometric relationship within a tolerance range or identifying the designed geometric relationship matching the coordinate-rotated geometric relationship within a tolerance range among the designed geometric relationships.

Technical Solution

A method for authenticating capacitive touch according to the present invention is a method for authenticating capacitive touch that is executed through a system interworking with a capacitive touch screen that supports multi-touch, the method including: a first step of receiving touch point information for the plurality of touch points recognized as multi-touch through the capacitive touch screen; a second step of reading the touch point information and identifying a specified touch point corresponding to any one specified touch portion fixed and arranged in a previously specified position in design among touch portions of a touch device in which a plurality of capacitively touchable touch portions are arranged according to a previously designed unique geometric relationship; a third step of coordinate-rotating the plurality of touch points or a geometric relationship for the plurality of touch points to match a designed geometric relationship based on a reference point corresponding to the specified touch point; and a fourth step of authenticating whether the coordinate-rotated geometric relationship matches the designed geometric relationship within a tolerance range or identifying the designed geometric relationship matching the coordinate-rotated geometric relationship within a tolerance range among the designed geometric relationships.

According to the present invention, the touch point information may include a coordinate value in a coordinate system set in the capacitive touch screen in which the plurality of touch points are recognized as multi-touch.

According to the present invention, the designed geometric relationship may include a distance relationship and an angular relationship between center points of the respective touch portions. Meanwhile, the designed geometric relationship may include a distance relationship and an angular relationship between the center point of the specified touch portion and the center point of the other touch portions. Meanwhile, the designed geometric relationship may include the distance relationship and the angular relationship between a coordinate origin identified using the specified touch point and the center point of each touch portion.

According to the present invention, the reference point may include the specified touch point or a coordinate origin identified using the specified touch point.

According to the present invention, the geometric relationship for the plurality of touch points may include a distance relationship and an angular relationship between the respective touch points. Meanwhile, the geometric relationship for the plurality of touch points may include a distance relationship and an angular relationship between the specified touch point and the other touch points. Meanwhile, the geometric relationship for the plurality of touch points may include a distance relationship and an angular relationship between a coordinate origin identified using the specified touch point and each touch point.

According to the present invention, the distance relationship may include a coordinate distance in a coordinate system for reading the geometric relationship. Meanwhile, the angular relationship may include a coordinate angle in a coordinate system for reading the geometric relationship.

According to the present invention, the method may further include: coordinate-transforming the touch point information to a coordinate system corresponding to the designed geometric relationship.

According to the present invention, the method may further include: authenticating whether the number of touch points included in the touch point information matches the number of touch portions in design.

According to the present invention, the method may further include: a touch point authentication step of reading mutual position relationship between the respective touch points and authenticating whether the plurality of touch points are touch points of a valid touch device. Meanwhile, the method may further include: authenticating whether a distance between the respective touch points is equal to or greater than a minimum distinction recognition distance set in design. Meanwhile, the touch point authentication step may include authenticating whether a maximum spacing distance among distances between the respective touch points is smaller than a maximum spacing distance set in design. Meanwhile, the touch point authentication step may include authenticating whether a polygonal geometric characteristic formed by segments connecting the respective touch points includes a polygonal geometric characteristic capable of being formed by connecting center points of the touch portions arranged in the touch device.

According to the present invention, the second step may include reading the geometric structure of the touch points corresponding to the touch point information based on a designed geometric structure condition for arranging a plurality of touch portions in a flat plate area of a frame portion included in the touch device, and identifying the specified touch point fixed and arranged in the specified position within the flat plate area.

According to the present invention, the designed geometric relationship may include a relationship in which a specified number of touch portions are arranged in calculated positions within n (n≥4) division area one by one, in which one specified touch portion is arranged in a specified position within any one of the n division areas, and the second step may include confirming the specified area including two touch points among the n division areas based on the division area information in design, and identifying a specified touch point corresponding to the specified position within the confirmed specified area.

According to the present invention, the method may further include: coordinate-transforming the specified touch point and other touch points into a coordinate system corresponding to the designed geometric relationship upon identifying the specified touch point.

According to the present invention, the method may further include: calculating a geometric relationship of the coordinate-rotated touch points. Meanwhile, the method may further include: coordinate-transforming the calculated geometric relationship into a coordinate system corresponding to the designed geometric relationship upon calculating the geometric relationship.

According to the present invention, the system may be implemented through a user device including the capacitive touch screen, implemented on a server communicating with the user device including the capacitive touch screen, or implemented on the user device including the capacitive touch screen and the server in a distributed manner.

Advantageous Effects

According to the present invention, there is an advantage that, when the touch device including a plurality of capacitively touchable touch portions arranged in a previously designed geometric relationship is touched in the capacitive touch screen, the geometric relationship formed by the respective touch points is authenticated even when the touch device is freely touched without needing to be aligned in a specific position or a specific direction in the capacitive touch screen.

According to the present invention, there is an advantage that the maximum number of cases in which a specified number of touch portions can be uniquely arranged within a limited area of the frame portion included in the touch device can be derived.

DESCRIPTION OF DRAWINGS

FIG. 1 is a diagram illustrating a configuration of a touch authentication system according to an embodiment method of the present invention.

FIGS. 2A to 2C illustrate a flat plate area of a frame portion according to an embodiment of the present invention.

FIGS. 3A and 3B illustrate an embodiment in which specified touch portions among a predetermined number of touch portions are fixed and arranged according to an embodiment of the present invention.

FIGS. 4A and 4B illustrate a minimum distinction recognition distance according to an embodiment method of the present invention.

FIG. 5 illustrates a minimum identification distance according an embodiment of the present invention.

FIG. 6 illustrates a possible maximum spacing distance according to an embodiment of the present invention.

FIG. 7 illustrates a geometric characteristic of a polygon formed by touch points according to an embodiment of the present invention.

FIG. 8 illustrates a distance relationship among geometric relationships according an embodiment of the present invention.

FIGS. 9A and 9B illustrate an angular relationship among geometric relationships according an embodiment of the present invention.

FIG. 10 is a flowchart illustrating a process of registering a touch authentication condition according to an embodiment of the present invention.

FIG. 11 is a flowchart illustrating a touch authentication process according to an embodiment of the present invention.

FIG. 12 is a flowchart illustrating a touch authentication process according to another embodiment of the present invention.

MODE FOR INVENTION

Hereinafter, an operation principle of preferred embodiments of the present invention will be described in detail with reference to the accompanying drawings. However, the drawings and a description to be described below are related to preferred embodiment methods among several methods for effectively explaining the characteristics of the present invention, and the present invention is not limited by only the drawings and the description to be described below. For example, a configuration unit included in a server is implemented on the device side or, adversely, a configuration included in the device is implemented on the server side.

Further, when a concrete description of a related known function or configuration is judged to make the gist of the present invention unnecessarily ambiguous in explaining the present invention, the concrete description will be described. Also, terms to be described below are terms defined in consideration of functions in the present invention, and can be changed according to the intention or practice of a user or an operator. Therefore, the terms should be defined based on entire content of the present invention.

As a result, a technical idea of the present invention is determined by claims, and the following embodiments are only means for effectively explaining the technical idea of the present advanced invention to a person skilled in the art to which the present invention belongs.

FIG. 1 is a diagram illustrating a configuration of a touch authentication system 100 according to an embodiment method of the present invention.

More specifically, FIG. 1 illustrates a configuration of a system in which, when a touch device in which a specified number of touch portions 300 formed of a capacitively touchable material are arranged according to a previously designed unique geometric relationship is touched in a capacitive touch screen, comparison and authentication are performed to determine whether a geometric relationship formed by the specified number of touch points touched in the capacitive touch screen matches a previously registered designed geometric relationship even when the touch device is freely touched without being aligned in a specific position or a specific direction in the capacitive touch screen. The system configuration illustrated to FIG. 1 can be programmed and implemented in a device including a capacitive touch screen on which a specified number of touch points are touched, can be implemented on a server that communicates with the user device, or can be implemented on the user device and the sever in a distributed manner. It should be noted that all such embodiments are included in the right scope of the present invention. It should be noted that, in description of the present invention, the touch portion 300 included in the touch device may include a plurality of touch portions even when the touch portion 300 included in the touch device is expressed in a singular form.

The touch device of the present invention includes, in the capacitive touch screen, a specified number of touch portions 300 formed of a capacitively touchable material, and a frame portion 200 in which the specified number of touch portions 300 are arranged in and fixed to a flat plate area 205 having a previously specified figure form according to a previously designed unique geometric relationship. The touch device may further include a handle that can be held with a hand of a user.

The touch portion 300 is a generic name of a configuration in which capacitive touch is implemented in a capacitive touch screen and that is recognized as a touch point. Preferably, the touch portion 300 can be formed of a conductive material for capacitive touch or can include a conductive material on at least one side. However, the material of the touch portion 300 is not limited to the conductive material, and may be any material that is touchable on the capacitive touch screen. When the material of the touch portion 300 includes the conductive material, the frame portion 200 and the handle include a conductive material which is electrically connected to the conductive material of the touch portion 300. When the handle is held with the hand of the person, capacitance of a human body is transferred to the touch portion 300 through the conductive material of the handle and the conductive material of the frame portion 200.

The touch portion 300 is designed and produced to have a contact area calculated to be touched in the capacitive touch screen and recognized as one valid touch point. Here, the calculated contact area includes an area equal to or greater than an area corresponding to minimum touch sensitivity, which can be recognized as a valid touch point in each capacitive touch screen based on capacitance of the human body. When the touch device is designed to be touchable in two or more different capacitive touch screens having different touch sensitivity, it is preferable for the contact area of the touch portion 300 to be calculated as an area equal to or greater than a greater area (that is, an area corresponding to a smaller minimum touch sensitivity) among areas corresponding to the respective touch sensitivities recognizable in the respective capacitive touch screens. For example, the contact area of the touch portion 300 can be calculated to be an area equal to or greater than 25 mm$^2$ (=5 mm×5 mm).

The frame portion 200 is a generic name of a configuration in which a specified number of touch portions 300 are arranged and fixed according to a previously designed unique geometric relationship. Preferably, the frame portion 200 includes a flat plate area 205 having a previously specified figure form, and the specified number of touch portions 300 are arranged in and fixed to the flat plate area 205 according to the previously designed unique geometric relationship.

The flat plate area 205 of the frame portion 200 is designed and produced to have a figure form (for example, a circle, an ellipse, a square, a rectangle, a pentagon, or a T-gon (T>5)) that is a touchable without being aligned in a specific position or a specific direction on the capacitive touch screen. The flat plate area 205 having each figure form has a greatest length in a geometric structure of each figure (for example, a diagonal length of the square or a diameter of a circle). The greatest length of the flat plate area 205 includes a length smaller than or equal to a shortest length among horizontal and vertical lengths of the capacitive touch screen. When the touch device is designed to be touchable in two or more different touch screens having different horizontal and vertical lengths, the greatest length of the flat plate area 205 can be a length smaller than or equal to the shortest length among horizontal and vertical lengths of each capacitive touch screen. For example, even when the figure shape of the flat plate area 205 is a square, and the shortest length among horizontal and vertical lengths of the capacitive touch screen with the touch device to be touched is 4.5 cm, a diagonal length of the flat plate area 205 in a square shape is smaller than or equal to 4.5 cm, such that the touch device is touchable without being aligned in the specific position or the specific direction in the capacitive touch screen. However, the shortest length of the flat plate area 205 is only one embodiment for completely free touch. When a partially free touch is provided, the shortest length of the flat plate area 205 may be smaller than the shortest length of the capacitive touch screen, and the greatest length of the flat plate area 205 may be smaller than the greatest length of the capacitive touch screen.

When the greatest length of the figure shape corresponding to the flat plate area 205 of the frame portion 200 is determined, a flat plate area of the flat plate area 205 corresponding thereto is calculated. Since the touch portion 300 arranged in and fixed to the flat plate area 205 of the frame portion 200 has a previously calculated contact area, the geometric relationship formed by the touch portions 300 to be arranged in and fixed to the flat plate area 205 of the frame portion 200 depends on a figure shape and a flat plate area of the flat plate area 205, the number of touch portions 300 to be arranged in the flat plate area 205, and a contact area of the touch portion 300. For example, when the flat plate area 205 is a square having horizontal and vertical lengths of 3 cm (for example, the greatest length of the flat panel area 205 is about 4.24 cm), and five touch portions 300 having a circular contact area having a diameter of 6 mm (for example, the contact area of the touch portion 300 is about 28.27 mm$^2$) are arranged in the flat plate area 205, the geometric relationship formed by the five touch portions 300 is a pentagon, and the greatest length of the pentagon should be smaller than 3.64 cm (for example, a length obtained by subtracting a radius of each touch portion 300 from the greatest length of the flat plate area 205) within an tolerance range (for example, an error in a process of calculating the touch point with a circular contact area having a diameter of 6 mm based on a touch surface touched in the capacitive touch screen).

When the specified number of touch portions 300 arranged in the frame portion 200 are touched in the capacitive touch screen, the specified number of touch portions 300 should be all recognized as individual touch points, and the touch points corresponding to the number of touch portions 300 arranged in the frame portion 200 should be recognized through the capacitive touch screen. However, most capacitive touch screens in which fingers of a person are used as a touch input means have a characteristic that two or more adjacent touches are recognized as one touch point. Therefore, the respective touch portions 30 should be arranged to be spaced by a previously calculated minimum distinction recognition distance in order for a specified number of touch portions 300 arranged in the frame portion 200 to be all recognized as individual touch points. Here, the minimum distinction recognition distance includes a minimum spacing distance that allows two or more touch surfaces adjacent in the capacitive touch screen to be recognized as different touch points. However, since such a minimum distinction recognition distance is correlated with an area of a surface touched in the capacitive touch screen and cannot be quantified, no manufactures provide information regarding the minimum distinction recognition distance for their capacitive touch screens. Therefore, for the minimum distinction recognition distance, a distance at which each distinguished touch point is recognized after the touch surface corresponding to the calculated contact area of the touch portion 300 is touched in the capacitive touch screen of each target device in which the touch device is to be touched can be experimentally acquired. When the minimum distinction recognition distance is different between the respective capacitive touch screens for the same contact area, the greatest distance among the minimum distinction recognition distances acquired for the respective capacitive touch screens can be determined to be the minimum distinction recognition distance at which the touch portions 300 to be arranged in the frame portion 200 are spaced and arranged. For example, the minimum distinction recognition distance can be calculated so that a distance between borders of the contact areas of the touch portion 300 is equal to or more than 7 mm. Thus, when the minimum distinction recognition distance of the touch portion 300 to be fixed and arranged in the flat plate area 205 of the frame portion 200 is determined, the geometric relationship formed by the touch portions 300 to be arranged and fixed in the flat plate area 205 of the frame portion 200 also depends on the minimum distinction recognition distance. For example, when five touch portions 300 having a contact area in a circular shape having a diameter of 6 mm are arranged in the flat plate area 205 of the frame portion 200 and the minimum distinction recognition distance is 7 mm, a side having a minimum length of a pentagon formed by the five touch portions 300 should have a length equal to or more than 13 mm (for example, minimum distinction recognition distance plus a radius of each touch portion 300) in a tolerance range.

The geometric relationships formed by a specified number of touch portions 300 arranged in the frame portions 200 of the respective touch devices should be unique to be identified from one another. However, in the case of some capacitive touch screens in which fingers of a person is used as a touch input means, even when a surface touched in a specific position is slightly spaced or its area is slightly changed, such a touch point is not recognized as a different touch point, but is calculated to be the same touch point. Such a touch point calculation method is suitable for the purpose of preventing wrong input when the fingers are used as a touch input means, but limits the number of cases in which the specified number of touch portions 300 having a predetermined contact area can be arranged within a limited flat plate area of the flat plate area 205. Therefore, in order to maximize the number of cases in which the specified number of touch portions 300 are arranged within the limited flat plate area 205 of the frame portion 200, the specified number of touch portions 300 arranged in the frame portions 200 of the different touch devices should be arranged to be spaced above the previously set minimum identification distance. For example, when five touch portions 300 are arranged in the flat plate area 205 of frame portions 200 of two different touch device, the four touch portion 300 among the five touch portions 300 arranged in the flat plate area 205 of the frame portion 200 of each touch device are arranged in the same position and the other touch portion 300 is arranged in a different place, the minimum identification distance includes a minimum spacing distance at which one touch portion 300 arranged in a different position is recognized as a touch point touched in a different position. However, since such a minimum identification distance is limited by recognition ability of the touch screen itself, but is limited so as to recognize the fingers of the person as a touch input means, no manufactures provide information regarding their minimum identification distances. Therefore, for the minimum identification distance, a distance at which each distinguished touch point is recognized after the touch surface corresponding to the calculated contact area of the touch portion 300 is touched in the capacitive touch screen of each target device in which the touch device is to be touched can be experimentally acquired. When the minimum identification distance is different between the respective capacitive touch screens, a greatest distance among the minimum identification distances acquired for the respective capacitive touch screens can be determined as the minimum identification distance of the touch portion 300 to be arranged in the frame portion 200.

According to the embodiment method of the present invention, any one of the specified number of touch portions 300 arranged in the flat plate area 205 of the frame portion 200 is fixed and arranged in the specified position within the flat plate area 205, and the other touch portions 300 can be arranged in calculated positions in the flat plate area 205. For example, when the figure shape of the flat plate area 205 is a square, any one of the specified number of touch portions 300 is fixed and arranged at any one corner portion of the square, and the other touch portions 300 can be arranged in calculated positions within the area of the square. When one of the specified number of touch portions 300 is fixed and arranged in any one specified position within the previously designed flat plate area 205, the other touch portions 300 are arranged in any calculated positions within the flat plate area 205, and then the specified number of touch portions 300 arranged in the flat plate area 205 are touched in the capacitive touch screen, any one touch point corresponding to any one touch portion 300 fixed and arranged in the specified position within the flat plate area 205 among the specified number of touch points recognized through the capacitive touch screen can be identified using a geometric structure condition including one or more of a design condition of the frame portion 200, a design condition of the touch portion 300, and an arrangement condition for arranging the specified number of touch portions 300 in the flat plate area 205 of the frame portion 200. Hereinafter, the touch portion 300 fixed and arranged in any one specified position within the flat plate area 205 is referred to as a "specified touch portion 300" to be distinguished from the other touch portions 300, and a touch point corresponding to the specified touch portion 300 is referred to as a "specified touch point" to explain a characteristic of the present invention.

According to a preferred embodiment of the present invention, the touch device can be produced by dividing the flat plate area 205 of the frame portion 200 into n (n≥4) division areas in design, arranging n touch portions 300 in the calculated positions within the n division areas, and fixing and arranging the touch portion 300 in a specified position within any one of the n division areas. In this case, the (n+1) touch points touched in the capacitive touch screen are caused to match information of the division areas in design, and a touch point corresponding to the specified position in any one division area in which two touch points are recognized among the n division areas in design can be identified as a specified touch point corresponding to the specified touch portion 300. However, the embodiment in which the flat plate area 205 of the frame portion 200 is divided into the n division areas and (n+1) touch portions 300 are arranged is only an embodiment for recognizing the specified touch points more easily. Even when the flat plate area 205 of the frame portion 200 is not divided in n in design, a specified touch point corresponding to the specified touch portion 300 fixed and arranged in the specified position within the flat plate area 205 among the (n+1) touch points recognized through the capacitive touch screen can be identified using the geometric structure condition including one or more of a design condition of the frame portion 200, a design condition of the touch portion 300, and an arrangement condition for arranging a specified number of touch portions 300 in the flat plate area 205 of the frame portion 200. In the present invention, when the touch device in which the specified number of touch portions 300 are arranged in the flat plate area 205 of the frame portion 200 according to the geometry structure condition as described above is touched in the capacitive touch screen, any one of the specified number of touch points recognized through the capacitive touch screen is identified, and any one reference point identified using the specified touch point is compared for matching with the designed geometric relationship registered in advance by reading the geometric relationship formed by the specified number of touch points.

The specified number of touch portions 300 arranged in the frame portion 200 of the touch device designed and produced according to the geometric structure condition as described above form a designed geometric relationship including a unique distance relationship and angular relationship in design for designed center points of the respective touch portions 300. In this case, the designed geometric relationship can include at least one of a distance relationship and an angular relationship between the center points of the respective touch portions 300 based on segments connecting the center points of the respective touch portions 300, a distance relationship and an angular relationship between the center point of the specified touch portion 300 and the center points of the other touch portions 300, and a distance relationship and an angular relationship between a coordinate origin identified based on the specified touch portion 300 and the center point of each touch portion 300.

According to the embodiment method of the present invention, a unique serial code for identifying the designed geometric relationship can be given to the touch device in which the specified number of touch portions 300 are arranged in the frame portion 200 according to a unique designed geometric relationship (for example, the frame portion 200 in which the specified number of touch portions 300 are arranged).

Referring to FIG. 1, the touch authentication system 100 includes an authentication condition storage unit 105 that stores the touch authentication condition including the designed geometric relationship for the specified number of touch portions 300 arranged in the frame portion 200 of the touch device produced according to the geometric structure condition.

The authentication condition storage unit 105 receives the designed geometric relationship of a specified number of touch portions 300 arranged in the frame portion 200 of the touch device which is a registration target from a device that generates the designed geometric relationship for a specified number of touch portions 300, a device in which a specified number of touch portions 300 are arranged in the frame portion 200 according to the designed geometric relationship, or a terminal that registers the designed geometric relationship, and stores a touch authentication condition including the designed geometric relationship in a specified storage medium 110. The storage medium 110 can be implemented on a server or can be included in a device including the capacitive touch screen. Preferably, it is preferable for the touch authentication condition to be stored in a mapped manner with unique serial code given to the touch device.

According to the embodiment method of the present invention, the authentication condition storage unit 105 confirms the error information in design corresponding to a tolerance range in design for the designed geometric relationship (for example, within a 95% matching range of a Gaussian probability distribution), and specified storage medium 110 can store a touch authentication condition including the error information in the designed geometric relationship in design.

According to the embodiment method of the present invention, the authentication condition storage unit 105 can classify and group designed geometric relationships based on a geometric characteristic (for example, a length of a side or an interior angle) of a polygon formed by the designed geometric relationship, and store a touch authentication condition containing the grouped designed geometric relationships. For example, when the designed geometric relationship has a pentagonal structure, the geometric relationship can be classified into a pentagonal geometric characteristic in which all interior angles are less than 180° and a pentagonal geometric characteristic in which at least one of the five interior angles exceeds 180°. By such classifying and grouping, time required to compare the designed geometric relationship registered in the storage medium 110 with the geometric relationship of the touch points recognized through the capacitive touch screen can be shortened.

According to the embodiment method of the present invention, the authentication condition storage unit 105 receives the serial code given to the touch device designed and produced as described above, and the touch point information actually measured by repeatedly touching the capacitance type touch panel of the measurement device above a specified number of times from the measurement device including a capacitive touch panel. The authentication condition storage unit 105 can confirm the designed geometric relationship included in the touch authentication condition matching the serial code among the touch authentication conditions registered in the storage medium 110 through the serial code according to a specified authentication procedure, and then repeatedly compare the information of touch points repeatedly touched through the capacitance type touch panel of the measurement device with the confirmed designed geometric relationship to confirm whether they match within the specified tolerance range. When the information of the repeatedly touched touch points matches the designed geometric relationship within the specified tolerance range or they closely match within the tolerance range in design, the authentication condition storage unit 105 can store the touch authentication condition containing the designed geometric relationship as a designed geometric relationship to be used for authentication. In this case, the authentication condition storage unit 105 calculates an actually measured error between the actually measured touch point information and the designed geometric relationship, and the designed tolerance included in the touch authentication condition can be updated with the measured tolerance. On the other hand, the process of actually measuring the geometric relationship of the touch portion 300 may be omitted and the present invention is not limited thereto.

Meanwhile, when the touch device designed and produced as described above is provided to a specified touch device use destination (for example, a person, a franchise, an agency, or a company in which the touch device is touched in the capacitive touch screen of the user to provide services), the authentication condition storage unit 105 receives the serial code given to the touch device and the information of touch points recognized through the capacitive touch screen of the terminal from the terminal device which is the touch device use destination including the capacitive touch screen. The authentication condition storage unit 105 confirms the designed geometric relationship included in the touch authentication condition matching the serial code among the touch authentication conditions registered in the storage medium 110 through the serial code according to a specified authentication procedure, and then compares the received touch point information with the confirmed designed geometric relationship to confirm whether they match within the specified tolerance range.

The authentication condition storage unit 105 receives the information for the touch device use destination from the terminal device which is the touch device use destination (for example, address information of the touch device use destination, information on a region to which touch device use destination belongs, and a name of the touch device use destination). When the information of touch points recognized through a capacitive touch screen included in the terminal device which is the touch device use destination matches the designed geometric relationship within the specified tolerance range, the authentication condition storage unit 105 can store position area information of the touch device use destination (for example, address information of the touch device use destination, region information, and position area coordinates of the touch device use destination that can be compared to positional information measured through a GPS) to map with the matched touch authentication condition.

Referring to FIG. 1, the touch authentication system 100 includes a touch point reception unit 115 that receives information of a specified number of touch points recognized as multi-touch through the capacitive touch screen included in the user device.

When the touch authentication system 100 is implemented on a server, the touch point reception unit 115 can receive the information of a specified number of touch points recognized as multi-touch through the capacitive touch screen of the user device from a program included in the user device. According to the embodiment method, the touch point reception unit 115 can receive the touch point information via the specified relay server. On the other hand, when the touch authentication system 100 is programmed in the user device, the touch point reception unit 115 can extract the information of the predetermined number of touch points recognized as multi-touch through the capacitive touch screen of the user device.

The information of the specified number of touch points can include coordinate value information for the touch points recognized based on a coordinate system on the device side set in the capacitive touch screen of the user device of which the touch device is touched (for example, a pixel coordinate system corresponding to the touch screen). The touch point reception unit 115 can receive the coordinate system identification information for identifying the coordinate system on the device side together with the touch point information. Meanwhile, according to the embodiment method, the touch point information can include information transformed into a coordinate system that matches the designed geometric relationship registered in the storage medium 110, and the present invention is not limited thereto.

According to the embodiment method of the present invention, it is preferable for the touch point reception unit 115 to receive unique information for identifying the user device together with the touch point information (for example, information for uniquely identifying the user device or identifying a model or a manufacturer of the device) from the user device. In this case, the unique information can be used as the coordinate system identification information.

According to the embodiment method of the present invention, the touch point reception unit 115 can receive the positional information of the user device (for example, the positional information measured through a GPS module included in the user device or positional information confirmed through a base station associated with the user device) while receiving the touch point information from the user device.

When the touch point information corresponding to the coordinate system on the device side is received from the user device, the touch point reception unit 115 coordinate-transforms the touch point information including coordinate values in the coordinate system on the device side into a coordinate value on the specified coordinate system corresponding to the touch authentication condition. When the user device coordinate-transforms the touch point information into the specified coordinate system and transfers the resultant information or when the touch point authentication unit 120, the touch point identification unit 125, or the geometric relationship calculation unit 130, which will be described below, performs a coordinate transformation procedure, the touch point reception unit 115 need not perform the coordinate transformation procedure.

Meanwhile, when the touch authentication system 100 is implemented in the user device including a capacitive touch screen, the touch point reception unit 115 confirms information of the specified number of touch point recognized through the capacitive touch screen of the device. When the coordinate system on the user device side is different from the specified coordinate system of the touch authentication condition, the touch point reception unit 115 can perform a procedure of coordinate-transforming the touch point information into a coordinate value in the specified coordinate system corresponding to the touch authentication condition. Meanwhile, when the touch authentication condition stored in the device is set and stored according to the coordinate system on the device side, the coordinate transformation of the touch point information can be omitted.

Referring to FIG. 1, the touch authentication system 100 includes a touch point authentication unit 120 that reads the mutual position relationship between the respective touch points recognized as touch through the capacitive touch screen of the user device, and authenticates the touch points of a valid touch device. According to the embodiment method of the present invention, the touch point authentication unit 120 can be programmed and implemented by the user device that recognizes the capacitive touch.

The touch point authentication unit 120 reads the touch point information received through the touch point reception unit 115, and authenticates whether the touch point is a touch point recognized through touch of the valid touch device designed and produced according to the geometric structure condition according to the present invention.

For example, the touch point authentication unit 120 can authenticate whether the touch points are touch points recognized through touch of the valid touch device by comparing the number of touch points with the number of touch portion 300 included in the valid touch device to determine whether they match. Alternatively, the touch point authentication unit 120 can authenticate whether the touch points are touch points of the valid touch device by calculating a distance between the respective touch points and performing reading to determine whether the calculated distance between touch points is equal to or greater than the minimum distinction recognition distance set for the valid touch device. Alternatively, the touch point authentication unit 120 can authenticate whether the touch points are touch points recognized through touch of the valid touch device by confirming a greatest distance between the respective touch points and performing reading to determine whether the greatest distance between the respective touch points is smaller than the greatest distance of the flat plate area 205. The comparison of the respective distances is performed based on coordinate distances on the same coordinate system, and accordingly coordinate transformation can be performed. Alternatively, the touch point authentication unit 120 can authenticate whether the touch points are touch points recognized through touch of the valid touch device by confirming a polygonal structure formed by segments connecting the respective touch points and performing reading to determine whether the polygonal structure is a polygonal structure that can be derived when the center points of the predetermined number of touch portions 300 arranged according to geometry structure conditions according to the present invention are connected.

Referring to FIG. 1, the touch authentication system 100 includes a touch point identification unit 125 that identifies a specified touch point corresponding to the specified touch portion 300 arranged in the specified position in the flat plate area 205 of the frame portion 200 among a specified number of touch points, a geometric relationship calculation unit 130 that calculates a geometric relationship for the specified number of touch points using the identified specified touch points, and a touch authentication processing unit 135 that performs authentication to determine whether the calculated geometric relationship of the touch points matches the designed geometric relationship included in the previously registered touch authentication condition or identifies the designed geometric relationship matching the calculated geometric relationship of the touch points among the designed geometric relationships included in the previously registered touch authentication condition.

The touch point identification unit 125 identifies the specified touch point corresponding to the specified touch portion 300 fixed and arranged in the specified positions in the flat plate area 205 of the frame portion 200 among the specified number of touch points using the geometric structure conditions including one or more of a design condition of the frame portion 200 for the valid touch device, a design condition of the touch portion 300, and an arrangement condition for arranging the specified number of touch portions 300 in the flat plate area 205 of the frame portion 200. For example, when the flat plate area 205 of the frame portion 200 included in the touch device is divided into n division areas in design, one touch portions 300 is arranged in each of the calculated position in the n division area, and the specified touch portion 300 is fixed to and arranged in the specified position in any one specified area among the n division areas, the touch point identification unit 125 can read the (n+1) touch points based on the division area information in design, confirm the specified area including two touch points among the n division areas, and identify the touch point corresponding to the specified position in the confirmed specified area as a specified touch point.

In the case of the first embodiment in which the division areas are used, the touch point identification unit 125 can perform, at least once, a process of determining any one of the (n+1) touch points to be a virtual specified touch point, matching the virtual specified touch point with the division area information in design, and coordinate-rotating the n touch points based on the virtual specified touch point so as to match the division area information in design with the (n+1) pieces of touch point information, such that the touch point identification unit 125 can check if there are two touch points in the specified area in which the virtual specified touch point is located among the n division areas, and there is one touch point in each of the other (n−1) division areas. When there are the two touch points in the specified area in which the virtual specified touch point is located and there is one touch point in each of the other (n−1) division areas, the virtual specified touch point can be identified as a specified touch point included in the specified position designed according to the present invention.

Meanwhile, the touch point identification unit 125 can perform a process of predicting a touch point highly likely to be the specified touch point among the (n+1) touch points based on a geometric characteristic of the (n+1)-gon formed by the (n+1) touch points so as to shorten a process of matching the division area information in design with (n+1) pieces of touch point information, preferentially determining the predicted touch point to be the virtual specified touch point, and performing matching. For example, when there is a vertex having an interior angle greater than 180° among vertexes of the (n+1)-gon, the touch point identification unit 125 can predict touch points on both sides of such a vertex to be virtual specified touch points.

In the case of the second embodiment in which the division areas are used, the touch point identification unit 125 performs, at least once, a process of matching a designed coordinate origin with the division area information in design, matching one of the (n+1) touch points with a position of the specified touch point based on the coordinate origin, and coordinate-rotating the (n+1) touch points based on the coordinate origin, such that the touch point identification unit 125 can check if there are two touch points in the specified area among the n division areas, and there is one touch point in each of the other (n−1) division areas. When there are the two touch points in the specified area and there is one touch point in each of the other (n−1) division areas, the virtual specified touch point can be identified as a specified touch point included in the specified position designed according to the present invention.

When any one of the specified number of touch points is identified through touch point identification unit 125, the geometric relationship calculation unit 130 calculates the geometric relationship of the touch points including at least one of a distance relationship and an angular relationship between the respective touch points based on segments connecting the respective touch points, a distance relationship and an angular relationship between the specified touch point and other touch points, and a distance relationship and an angular relationship between the coordinate origin identified based on the specified touch point and the respective touch points.

The distance relationship includes the coordinate distance on a specific coordinate system. The coordinate distance includes a relative coordinate distance calculated using a coordinate value based on the specific coordinate system, and can be expressed as a vector value further including a specific direction on the specific coordinate system according to the embodiment method.

The angular relationship includes a coordinate angle on a specific coordinate system. The coordinate angle can include at least one of an angle formed by segments connecting the respective touch points, an angle formed by segments connecting the respective touch points based on the specified touch point, and an angle formed by segments connecting the specified touch point and the respective touch points based on a specific baseline (for example, x axis) in the specific coordinate system.

According to the embodiment method of the present invention, the specific coordinate system can be a specified coordinate system corresponding to the designed geometric relationship included in the touch authentication conditions or can be a coordinate system on the device side. When the coordinate system corresponding to the distance relationship and the angular relationship that have been calculated and the coordinate system corresponding to the designed geometric relationship are different, the geometric relationship calculation unit 130 can perform a procedure of transforming the coordinate system on one side into the coordinate system on the other side.

When a geometric relationship for the specified number of touch points is calculated, the touch authentication processing unit 135 can coordinate-rotates the calculated geometric relationship using the specified touch point as a reference point among the specified number of touch points so that the calculated geometric relationship can be compared for matching with the designed geometric relationship included in the previously registered touch authentication condition, to thereby calculate the comparison target geometric relationship. Alternatively, the touch authentication processing unit 135 can identify a coordinate origin on the coordinate system based on the specified touch point, and coordinate-rotate the calculated geometric relationship using the coordinate origin as a reference so that the calculated geometric relationship can be compared for matching with the designed geometric relationship included in the previously registered touch authentication condition, to thereby calculate the comparison target geometric relationship.

When any one touch authentication condition to be compared for matching with the comparison target geometric relationship among the touch authentication conditions stored in the storage medium 110 can be confirmed (for example, when identification information that identifies a touch device use destination from the user device is received), the touch authentication processing unit 135 can extract the designed geometric relationship to be compared for matching with the comparison target geometric relationship from the storage medium 110, match the comparison target geometric relationship with the extracted designed geometric relationship for each touch point to compare the distance relationships and the angular relationships, and confirm whether they match or are close within a specified tolerance range.)

On the other hand, when any one touch authentication condition to be compared for matching with the comparison target geometric relationship among the touch authentication conditions stored in the storage medium 110 cannot be confirmed, the touch authentication processing unit 135 can identify a touch authentication condition containing the designed geometric relationship matching the comparison target geometric relationship within a tolerance range among the plurality of touch authentication conditions stored in the storage medium 110 by performing a process of matching the comparison target geometric relationship with the designed geometric relationship for each touch point and comparing a distance relationship and an angular relationship in the plurality of touch authentication conditions stored in the storage medium 110 to confirm whether they match or are close within the specified tolerance range. According to the embodiment method of the present invention, the touch authentication processing unit 135 confirms the geometric characteristic of the geometric relationship that is a comparison target and selects the touch authentication condition including the designed geometric relationship belonging to a group matching the geometric characteristic among the touch authentication conditions stored in the storage medium 110 as an authentication target touch authentication condition, or confirms positional information received from the user device, and selects the touch authentication condition matching the position area information corresponding to the positional information as authentication target touch authentication conditions, thereby reducing the number of designed geometric relationships that are authentication targets to be compared with the comparison target geometric relationship and thus shortening time required to authenticate the comparison target geometric relationship.

When the designed geometric relationship matching the geometric relationship of the touch points is confirmed, the touch authentication processing unit 135 generates a result of authenticating the touch point information (for example, authentication error or authentication success) and transmits the generated touch authentication result through a specified path. The touch authentication result can be provided to a user device or to a server providing a service that is specified as the user device.

FIGS. 2A to 2C illustrate the flat plate area 205 of the frame portion 200 according to an embodiment of the present invention.

FIG. 2A illustrates a flat plate area 205 of the frame portion 200 in a square shape. In the flat plate area 205 illustrated in FIG. 2a, each corner portion may be cut out in quadrangular form at a constant curvature.

FIG. 2B illustrates an example in which the flat plate area 205 illustrated in FIG. 2A is divided into four division areas. Since the flat plate area 205 of FIG. 2A is basically a quadrangle, the flat plate area 205 is divided into four division areas in FIG. 2b. When the figure shape of the flat plate area 205 is a pentagon, the division area can be divided into five division areas including five triangular areas around a center point. Alternatively, when the figure shape of the flat plate area 205 is a hexagon, the division area can be divided into six division areas including six triangular areas. On the other hand, when the figure shape of the flat plate area 205 is a rectangle, the division area can be divided into six division areas including six rectangular areas obtained by dividing a short side in two and a long side in three. It is preferable for each division area to have the same area. However, the present invention is not limited thereto, and each division area can have a different area according to the embodiment method.

FIG. 2C illustrates an embodiment method in which the flat plate area 205 illustrated in FIG. 2A is divided into four division areas with a constant margin. It is preferable for the margin between the division areas to be a margin of the minimum distinction recognition distance specified to be always far above the minimum distinction recognition distance even when the touch portions 300 included in the respective division areas are included in any positions of the division areas.

FIGS. 3A and 3B illustrate an embodiment in which specified touch portions 300 of a predetermined number of touch portions 300 are fixed and arranged according to an embodiment of the present invention.

More specifically, FIGS. 3A and 3B illustrate an embodiment method in which three touch portions 300 are included in calculated positions on the three division areas of the four division areas obtained by dividing the flat plate area 205 of FIG. 2A in four as in FIG. 2b, one specified touch portion 300 is included in the specified area on one specified area, and one touch portion 300 is included in one calculated position.

FIGS. 3A and 3B illustrate an embodiment in which a lower left area of four division areas obtained by dividing the flat plate area 205 illustrated in FIG. 2A in four is used as a division area in which one touch portion 300 is fixed and arranged, and the three other areas are used as division areas in which one touch portion 300 is arranged in any calculated position.

According to the example of FIG. 3A, the lower left specified area among the four division areas is set as a position in which a lower left edge portion contacting with an outline of the figure of the flat plate area 205 is specified to fix and arrange one specified touch portion 300.

According to the example of FIG. 3B, One specified touch portion 300 is fixed and arranged in the specified position of the lower left specified area in four division areas, and one touch portion 300 is included in any calculated position in each of the four division area.

FIGS. 4A and 4B illustrate a minimum distinction recognition distance according to an embodiment method of the present invention.

FIG. 4A illustrates an example in which a distance between borders of the touch portions 300 having a specified contact area is set as the minimum distinction recognition distance. FIG. 4B illustrates an example in which a distance between center points of the touch portion 300 having a specified contact area is set as a minimum distinction recognition distance.

According to the present invention, the touch portions 300 included in the flat plate area 205 should be included away above a set minimum distinction recognition distance even when the touch portions 300 are included in a certain division area. Preferably, the minimum distinction recognition distance is a distance applied to horizontal and vertical directions on a two-dimensional plane corresponding to the flat plate area 205.

FIG. 5 illustrated a minimum identification distance according an embodiment of the present invention.

FIG. 5 illustrates an embodiment in which, when five touch portions 300 are arranged in the flat plate areas 205 of different touch devices including the flat plate area 205 illustrated in FIG. 2a, four touch portions 300 are arranged in the same positions and the other touch portion 300 is arranged to be spaced by a minimum identification distance in a horizontal direction.

FIG. 6 illustrates a possible maximum spacing distance according to an embodiment of the present invention.

FIG. 6 illustrates a possible maximum spacing distance that can be implemented in the flat plate area 205 illustrated in FIG. 2a, and illustrates a possible maximum spacing distance calculated in an upper right division area from the specified touch portion 300 included in a specified position on the lower left specified area as in the example of FIG. 2B among the division areas illustrated in FIG. 2b.

FIG. 7 illustrates a polygonal geometric characteristic formed by touch points according to an embodiment of the present invention.

FIG. 7 illustrates an area in which there can be the center points or the touch points of the five touch portions 300, and an area in which there cannot be the center points or the touch points when the flat plate area 205 illustrated in FIG. 2A is divided in four division areas to have a margin corresponding to the minimum distinction recognition distance as in the example of FIG. 2c, and the lower left division area is specified as a specified area and a specified touch portion 300 is included in a lower left corner area as in the example of FIG. 2c. For convenience, the area in which there can be center points is indicated by dark gray, and the area in which there can be center points is indicated by bright gray, an error range of each area is omitted. For reference, the pentagon of FIG. 7 is formed based on the touch points, but is illustrated based on center points of the touch portions 300 in FIG. 7 for convenience to assist in understanding.

According to the present invention, the flat plate area 205, the division areas and the touch portions 300 have a specified figure form and a constant area, and it is necessary for the center point of the touch portion 300 included in the n division areas obtained by dividing the flat plate area 205 to be present in the area in which there can be center points, as illustrated in FIG. 7. Thus, since there are the area in which there can be center points and the area in which there cannot be center points, the two touch portions 300 are included in the specified area among the n division areas, and the touch portions 300 should be separate above the minimum distinction recognition distance and identified away a minimum identification distance from the touch portions 300 of the other touch device, the pentagon formed by connecting the five touch points has the specified geometric characteristic. For example, a distance between the center points should be equal to or more than a distance corresponding to the minimum distinction recognition distance, the distance between the center points is smaller than the possible maximum spacing distance, and at least one of the distances between the center point are included in the same specified area. Such a geometric characteristic may be expressed as a function of a distance and an angle of respective sides constituting the pentagon, and can be determined according to one or more conditions limiting pentagon formation among the figure forms of the flat plate area 205, the division areas, and the touch portions 300, the number of division areas, the minimum distinction recognition distance set in design, the possible maximum spacing distance, and the minimum identification distance.

FIG. 8 illustrates a distance relationship among geometric relationships according an embodiment of the present invention.

FIG. 8 illustrates a distance relationship among four touch points corresponding to respective touch portions 300 included in the calculated positions in four division areas based on a specified touch point corresponding to the specified touch portion 300 included in an edge area of the specified area on the lower left side among the division areas of FIG. 2B or 2c. For reference, the distance relationships are calculated and compared based on the touch points. For convenience, FIG. 8 is illustrated based on a center point of the touch portion 300 so as to assist in understanding.

The distance relationship included in the touch position relationship of the touch authentication condition and the distance relationship of the touch position relationship calculated based on the five touch points are compared after being matched, and a unique identifier can be given to each touch point so as to match the distance relationships. For example, identifiers such as "A," "B," "C," and "D" can be given to the touch points in a specific direction based on the specified touch point as in the example of FIG. 8, the distance relationship included in the touch position relationship of the touch authentication condition for each touch point corresponding to each identifier and the distance relationship of the touch position relationship calculated based on the five touch points are matched. When the distances for the respective matched identifiers are compared and close within a specified error range (for example, within a 95% matching range of a Gaussian probability distribution), the distances can be regarded as matching each other. Even when the compared distances are close within a specified error range, the distances are regarded as not matching each other when the distances corresponding to different identifiers are close.

FIGS. 9A and 9B illustrate an angular relationship among geometric relationships according an embodiment of the present invention.

FIGS. 9A and 9B illustrate an angular relationship formed by four touch points corresponding to the touch portions 300 included in positions calculated in the four division areas based on a specified touch point corresponding to the specified touch portion 300 included in the edge area of the specified area on the lower left side among the division areas of FIG. 2B or 2c. For reference, the angular relationship is calculated and compared based on the touch point, but for convenience, FIGS. 9A and 9B are illustrated based on a center point of the touch portion 300 to assist in understanding.

FIG. 9A illustrates an angular relationship in a coordinate system formed by two touch points among n touch points using a specified touch point as a reference point, and FIG. 9B illustrates an angular relationship formed by segments connecting the five touch points from a coordinate origin of the coordinate system based on the coordinate origin and a baseline of the coordinate system. The coordinate origin illustrated in FIG. 9B can exist within a specified touch point.

The angular relationship included in the touch position relationship of the touch authentication condition and the angular relationship of the touch position relationship calculated based on the five touch points are compared after being matched, and a unique identifier can be given to each touch point so as to match the angular relationships. For example, identifiers such as "A," "B," "C," "D" and "E" can be given to the touch points in a specific direction based on the specified touch point as in the example of FIGS. 9A and 9B, the angular relationship included in the touch position relationship of the touch authentication condition for each touch point corresponding to each identifier and the angular relationship of the touch position relationship calculated based on the five touch points are matched. When the angles for the respective matched identifiers are compared and close within a specified error range (for example, within a 95% matching range of the Gaussian probability distribution), the angles can be regarded as matching each other. Even when the compared angles are close within a specified error range, the angles are regarded as not matching each other when the distances corresponding to different identifiers are close.

FIG. 10 is a flowchart illustrating a process of registering a touch authentication condition according to an embodiment of the present invention.

More specifically, FIG. 10 illustrates a process of registering, in the storage medium 110, the touch authentication condition containing the designed geometric relationship for the touch device in which one touch portion 300 among the specified number of touch portions 300 is fixed and arranged in the specified position in the flat plate area 205 of the frame portion 200 and the other touch portions 300 are arranged in any calculated positions in the flat plate area 205. A person skilled in the art to which the present invention belongs can infer various embodiment methods (for example, an embodiment method in which some steps are omitted or an order is changed) for the process of storing the touch authentication condition by referring to and/or modifying FIG. 10, and the present invention includes all inferred embodiment methods. A technical characteristic is not limited by only the embodiment method illustrated in FIG. 10.

Referring to FIG. 10, the touch authentication system 100 confirms the designed geometric relationship for the touch device in which one touch portion 300 among the specified number of touch portions 300 to be arranged in the flat plate area 205 of the frame portion 200 is fixed and arranged in the specified position within the flat plate area 205 of the frame portion 200 and the other touch portions 300 are arranged in calculated positions in the flat plate area 205 (1000), and stores the serial code given to the touch device designed and produced as described above and the touch authentication condition containing the confirmed designed geometric relationship in the specified storage medium 110 (1005). The touch authentication condition can further contain error information in design for the designed geometric relationship.

According to the embodiment method of the present invention, when the geometric relationship of the touch portion 300 included in the touch device designed and produced as described above is actually measured and verified, the touch authentication system 100 receives the serial code given to the touch device to be verified through actual measurement, and the information of the actually measured touch points that are repeatedly touched above a specified number of times through the capacitance type touch panel of the measurement device from the specified measurement device (1010). When the actually measurement touch point information is received from the measurement device, the touch authentication system 100 checks if the actually measured touch point information matches the designed geometric relationship within the tolerance range in design (1015).

When the actually measured touch point information does not match the designed geometric relationship within the tolerance range in design, the touch authentication system 100 can perform a procedure of performing correction through rearrangement of the touch portions 300 in the flat plate area 205 of the frame portion 200 or a procedure of discarding the touch device and producing the same touch device again (1020).

Meanwhile, when the actually measured touch point information and the designed geometric relationship match within the tolerance range in design, the touch authentication system 100 stores a touch authentication condition for authentication containing the designed geometric relationship and tolerance information (1025). On the other hand, when the actually measurement process is omitted, a touch authentication condition containing the error information in design for the designed geometric relationship can be stored as a touch authentication condition for authentication.

Meanwhile, when the touch device designed and produced as described above is provided as the touch device use destination, the touch authentication system 100 receives the serial code given to the touch device and the information of the touch points touched through the capacitive touch screen included in the terminal device which is the touch device use from the terminal device which is the touch device use destination (1030).

The touch authentication system 100 checks if the touch point information received from the terminal device that is a touch device use destination matches the designed geometric relationship mapping to the serial code within an tolerance range (1035). When the touch point information received from the terminal device which is the touch device use destination matches the designed geometric relationship within an tolerance range, the touch authentication system 100 stores a touch authentication condition for authentication containing the designed geometric relationship confirmed to match, and the position area information of the touch device use destination derived based on the information received from the terminal device which is the touch device use destination, in a mapped manner (1040). The processes 1030 and 1035 can be omitted when a process of registering the touch device provided as the touch device use destination is performed through a separate management terminal.

FIG. 11 is a flowchart illustrating a touch authentication process according to an embodiment of the present invention.

More specifically, FIG. 11 illustrates a process in which, when a touch device in which one of the specified number of touch portions 300 is fixed and arranged in the specified position within the flat plate area 205 of the frame portion 200, and the other touch portions 300 are arranged in any calculated positions in the flat plate area 205 is touched in the capacitive touch screen of the user device, it is authenticated whether the geometric relationship for the specified number of touch points recognized through the capacitive touch screen matches the designed geometric relationship registered through the process illustrated in FIG. 10. A person skilled in the art to which the present invention belongs can infer various embodiment methods (for example, an embodiment method in which some steps are omitted or an order is changed) for the touch authentication process by referring to and/or modifying FIG. 11, and the present invention includes all inferred embodiment methods. A technical characteristic is not limited by only the embodiment method illustrated in FIG. 11.

Referring to FIG. 11, the touch authentication system 100 receives the touch point information for the specified number of touch points recognized as touch through the capacitive touch screen of the user device (1100), reads the mutual position relationship of the respective touch points based on the received touch point information, and authenticates whether the touch points are touch points touched by a valid touch device (1105). When the touch points are touch points touched by a valid touch device, the touch authentication system 100 can provide an authentication error to the user device recognizing the touch points (1110).

On the other hand, if the touch point is a touch point of a valid touch device, the touch authentication system 100 identifies a specified touch point corresponding to the specified touch portion 300 fixed and arranged in the specified position of the flat plate area 205 among the specified number of touch points, based on the geometry structure condition for arranging the specified number of touch portions 300 in the flat plate area 205 of the frame portion 200 of the valid touch device (for example, a design condition of the frame portion 200, a design condition of the touch portion 300, and an arrangement condition for arranging the specified number of touch portions 300 in the flat plate area 205 of the frame portion 200) (1115).

When any one specified touch point corresponding to the specified touch portion 300 fixed and arranged in the specified position of the specified number of touch points is not identified, the touch authentication system 100 can provide an authentication error to the user device recognizing the touch points (1110).

When any one specified touch point corresponding to the specified touch portion 300 fixed and arranged in the specified position among the specified number of touch points is identified, the touch authentication system 100 calculates the geometric relationship for the specified number of touch points using the specified touch point (1120). The calculated geometric relationship can include at least one of a distance relationship and an angular relationship between the respective touch points based on segments connecting the respective touch points, a distance relationship and an angular relationship between the specified touch point and other touch points, and a distance relationship and an angular relationship between the coordinate origin identified based on the specified touch point and the respective touch points.

The touch authentication system 100 coordinate-rotates the geometric relationship of the touch points to match the designed geometric relationship based on the reference point corresponding to the calculated specified touch point (for example, the specified touch point or a coordinate origin identified using the specified touch point) to calculate the comparison target geometric relationship (1125).

The touch authentication system 100 extracts the designed geometric relationship to be compared with the comparison target geometric relationship among the touch authentication conditions including the designed geometric relationship registered through the process illustrated in FIG. 10 (1130). The designed geometric relationship can be extracted through at least one piece of identification information received from the user device. The touch authentication system 100 authenticates whether the calculated comparison target geometric relationship matches the extracted designed geometric relationship within a tolerance range (1135).

When the calculated comparison target geometric relationship does not match the extracted designed geometric relationship within a tolerance range, the touch authentication system 100 performs a procedure of processing an authentication failure result for the touch points (1140).

On the other hand, when the calculated comparison target geometric relationship does not match the extracted designed geometric relationship within a tolerance range, the touch authentication system 100 performs a procedure of processing an authentication success result for the touch points (1145). Based on this, service specified to be provided through touch of the touch device in the capacitive touch screen of the user device.

FIG. 12 is a flowchart illustrating a touch authentication process according to another embodiment of the present invention.

More specifically, FIG. 12 illustrates a process in which, when a touch device in which one of the specified number of touch portions 300 is fixed and arranged in the specified position in the flat plate area 205 of the frame portion 200, and the other touch portions 300 are arranged in any calculated positions in the flat plate area 205 is touched in the capacitive touch screen of the user device, the designed geometric relationship matching the geometric relationship of the specified number of touch points recognized through the capacitive touch screen among the designed geometric relationship registered through the process illustrated in FIG. 10 is identified. A person skilled in the art to which the present invention belongs can infer various embodiment methods (for example, an embodiment method in which some steps are omitted or an order is changed) for the touch authentication process by referring to and/or modifying FIG. 12, and the present invention includes all inferred embodiment methods. A technical characteristic is not limited by only the embodiment method illustrated in FIG. 12.

Referring to FIG. 12, the touch authentication system 100 identifies the specified touch point among the specified number of touch points touched in the capacitive touch screen of the user device using the same process as the processes 1100 to 1125 illustrated in FIG. 11, and calculates the comparison target geometric relationship.

The touch authentication system 100 selects an authentication target touch authentication condition for authenticating the comparison target geometric relationship among the touch authentication conditions registered through the process illustrated in FIG. 10 using the geometric characteristic of the comparison target geometric relationship or the positional information received from the user device (1230), and confirms the touch authentication condition including the designed geometric relationship matching with the comparison target designed geometric relationship among the designed geometric relationships included in the selected authentication target touch authentication condition within the tolerance range (1235). When the touch authentication condition including the designed geometric relationship matching the comparison target geometric relationship within the tolerance range is confirmed, the touch authentication system 100 performs a procedure of processing the authentication success result for the touch point (1240). Based on this, service specified to be provided through touch of the touch device in the capacitive touch screen of the user device.

Meanwhile, when the touch authentication condition including the designed geometric relationship matching the comparison target geometric relationship within a tolerance range is not confirmed, the touch authentication system 100 repeats a process of confirming the designed geometric relationship matching the comparison target geometric relationship within a tolerance range with respect to all selected authentication target touch authentication conditions. When the designed geometric relationship matching the comparison target geometric relationship within a tolerance range with respect to all selected authentication target touch authentication conditions is not confirmed, the touch authentication system 100 performs a procedure of processing an authentication failure result for the touch point (1245).

The invention claimed is:

1. A method for authenticating capacitive touch that is executed through a system interworking with a capacitive touch screen that supports multi-touch and storing designed geometric relationships for arranging a plurality of touch portions in a unique geometric relationship on a touch device that is to be touched in a capacitive touch screen, the method comprising:

receiving touch point information about a plurality of touch points recognized as multi-touch through the capacitive touch screen;

reading the touch point information and identifying one of the recognized touch points which corresponds to a reference point associated with a predetermined touch portion arranged in a predetermined position among the plurality of touch portions arranged in one of the designed geometric relationships on the touch device, wherein the touch device comprises a plurality of division areas in which the touch portions are arranged, and the identifying the one of the recognized touch points which corresponds to the reference point comprises identifying the reference point by using the number of the touch portions arranged in each of the division areas;

rotating coordinates of the recognized touch points or a geometric relationship for the recognized touch points based on the identified touch point corresponding to the reference point; and authenticating whether the rotated touch points or geometric relationship matches one of the stored designed geometric relationships within a tolerance range or identifying a geometric relationship matching the rotated touch points or geometric relationship within a tolerance range among the stored designed geometric relationships.

2. The method according to claim 1, wherein the touch point information includes a coordinate value in a coordinate system set in the capacitive touch screen in which the plurality of touch points are recognized as multi-touch.

3. The method according to claim 1, wherein the designed geometric relationship includes at least one of a distance relationship and an angular relationship between center points of the respective touch portions.

4. The method according to claim 1, wherein the designed geometric relationship includes at least one of a distance relationship and an angular relationship between the center point of the predetermined touch portion and the center point of the other touch portions.

5. The method according to claim 1, wherein the designed geometric relationship includes at least one of the distance relationship and the angular relationship between a coordinate origin identified using the predetermined touch point and the center point of each touch portion.

6. The method according to claim 1, wherein the reference point includes the predetermined touch point or a coordinate origin identified using the predetermined touch point.

7. The method according to claim 1, wherein the geometric relationship for the plurality of touch points includes at least one of a distance relationship and an angular relationship between the respective touch points.

8. The method according to claim 1, wherein the geometric relationship for the plurality of touch points includes at least one of a distance relationship and an angular relationship between the predetermined touch point and the other touch points.

9. The method according to claim 1, wherein the geometric relationship for the plurality of touch points includes at least one of a distance relationship and an angular relationship between a coordinate origin identified using the predetermined touch point and each touch point.

10. The method according to claim 7, wherein the distance relationship includes a coordinate distance in a coordinate system for reading the geometric relationship.

11. The method according to claim 7, wherein the angular relationship includes a coordinate angle in a coordinate system for reading the geometric relationship.

12. The method according to claim 1, further comprising:
coordinate-transforming the touch point information to a coordinate system corresponding to the designed geometric relationship.

13. The method according to claim 1, further comprising:
authenticating whether the number of touch points included in the touch point information matches the number of touch portions in design.

14. The method according to claim 1, further comprising:
reading mutual position relationship between the respective touch points and authenticating whether the plurality of touch points are touch points of a valid touch device.

15. The method according to claim 14, further comprising:
authenticating whether a distance between the respective touch points is equal to or greater than a minimum distinction recognition distance set in design.

16. The method according to claim 14, wherein the reading the mutual position relationship between the respective touch points and the authenticating whether the plurality of touch points are the touch points of the valid touch device includes authenticating whether a maximum spacing distance among distances between the respective touch points is smaller than a maximum spacing distance set in design.

17. The method according to claim 14, wherein the reading the mutual position relationship between the respective touch points and the authenticating whether the plurality of touch points are the touch points of the valid touch device includes authenticating whether a polygonal geometric characteristic formed by segments connecting the respective touch points includes a polygonal geometric characteristic capable of being formed by connecting center points of the touch portions arranged in the touch device.

18. The method according to claim 1, wherein the receiving the touch point information includes reading the geometric structure of the touch points corresponding to the touch point information based on a designed geometric structure condition for arranging a plurality of touch portions in a flat plate area of a frame portion included in the touch device, and identifying a specified touch point fixed and arranged in a specified position within the flat plate area.

19. The method according to claim 1,
wherein the designed geometric relationship includes a relationship in which the touch portions are positioned at calculated positions in n-division areas (n≥4) partitioned in design, respectively, and one touch portion is fixed in a designated position in one designated area out of the n-division areas, and
the receiving the touch point information includes confirming a specified area including two touch points among the n-division areas by reading the touch point information based on the division area information in design, and identifying a specified touch point corresponding to a specified position within the confirmed specified area.

20. The method according to claim 1, further comprising:
coordinate-transforming the predetermined touch point and other touch points into a coordinate system corresponding to the designed geometric relationship upon identifying the predetermined touch point.

21. The method according to claim 1, further comprising:
calculating a geometric relationship of the rotated touch points.

22. The method according to claim 1, further comprising:
coordinate-transforming the calculated geometric relationship into a coordinate system corresponding to the designed geometric relationship upon calculating the geometric relationship.

23. The method according to claim 1,
wherein the system is implemented through a user device including the capacitive touch screen, implemented on a server communicating with the user device including the capacitive touch screen, or implemented on the user device including the capacitive touch screen and the server in a distributed manner.

24. The method of claim 1, wherein the number of touch portions arranged in one division area having the reference point is different from the number of touch portions arranged in other division areas that do not have the reference point.

25. The method of claim 24, wherein two or more touch portions are disposed in the one division having the reference point and one touch portion is disposed in each of the other division areas that do not have the reference point.

26. The method of claim 1, wherein the identifying the one of the recognized touch points which corresponds to the reference point comprises identifying the reference point by using a polygonal shape which is formed by connecting the recognized touch points.

27. The method of claim 1, wherein the identifying the one of the recognized touch points which corresponds to the reference point comprises identifying the reference point by using an angle formed by three touch points which are adjacently located among the plurality of touch points.

28. The method of claim 1, wherein the designed geometric relationships previously registered in the system.

* * * * *